United States Patent [19]
Aoki et al.

[11] Patent Number: 5,287,772
[45] Date of Patent: Feb. 22, 1994

[54] TRANSMISSION CONTROL SYSTEM IN ELECTRIC VEHICLE

[75] Inventors: Yasushi Aoki; Nobuyoshi Asanuma; Atsuo Ohno; Takeshi Ohba, all of Saitama, Japan

[73] Assignee: Honda Giken Kogyo Kabushiki Kaisha, Tokyo, Japan

[21] Appl. No.: 987,041

[22] Filed: Dec. 7, 1992

[30] Foreign Application Priority Data

Dec. 5, 1991 [JP] Japan .................. 3-322084

[51] Int. Cl.$^5$ ............................. F16H 59/14
[52] U.S. Cl. ........................ 74/846; 303/3; 318/139; 318/375; 180/165; 180/65.3
[58] Field of Search ............. 74/846, 861; 180/165, 180/65.3, 65.7; 303/3; 318/139, 371, 375

[56] References Cited

U.S. PATENT DOCUMENTS

| | | | |
|---|---|---|---|
| 4,095,665 | 6/1978 | Armfield | 180/65.3 |
| 4,096,418 | 6/1978 | Marumoto et al. | 318/12 |
| 4,284,936 | 8/1981 | Bailey et al. | 318/381 |
| 4,388,977 | 6/1983 | Bader | 180/165 |
| 4,419,610 | 12/1983 | Pollman | 318/12 |
| 4,597,463 | 7/1986 | Barnard | 180/165 |
| 4,663,937 | 5/1987 | Cullin | 60/431 |
| 4,689,531 | 8/1987 | Bacon | 318/139 |
| 4,821,190 | 4/1989 | Patil | 364/424.1 |
| 4,855,914 | 8/1989 | Davis et al. | 364/424.1 |
| 4,928,227 | 5/1990 | Burba et al. | 364/424.01 |
| 5,215,156 | 6/1993 | Stalbach et al. | 180/65.3 |

*Primary Examiner*—Dirk Wright
*Attorney, Agent, or Firm*—Lyon & Lyon

[57] ABSTRACT

A transmission control system in an electric vehicle in which a battery is used as en energy source for a motor and is charged with an electric power generated through the motor by regenerative braking of driving wheels which are connected to the motor through a transmission. In the transmission control system, a regenerative energy capable of being generated at a current transmission ratio, a regenerative energy capable of being generated when such transmission ratio is increased, and a regenerative energy capable of being generated when such transmission ratio is decreased, are calculated and compared with one another, thereby shift-changing the transmission into a shift position which permits the largest regenerative energy to be provided. This ensures that the efficiency of recovery of the energy can be increased to the maximum to effectively charge the battery.

8 Claims, 31 Drawing Sheets

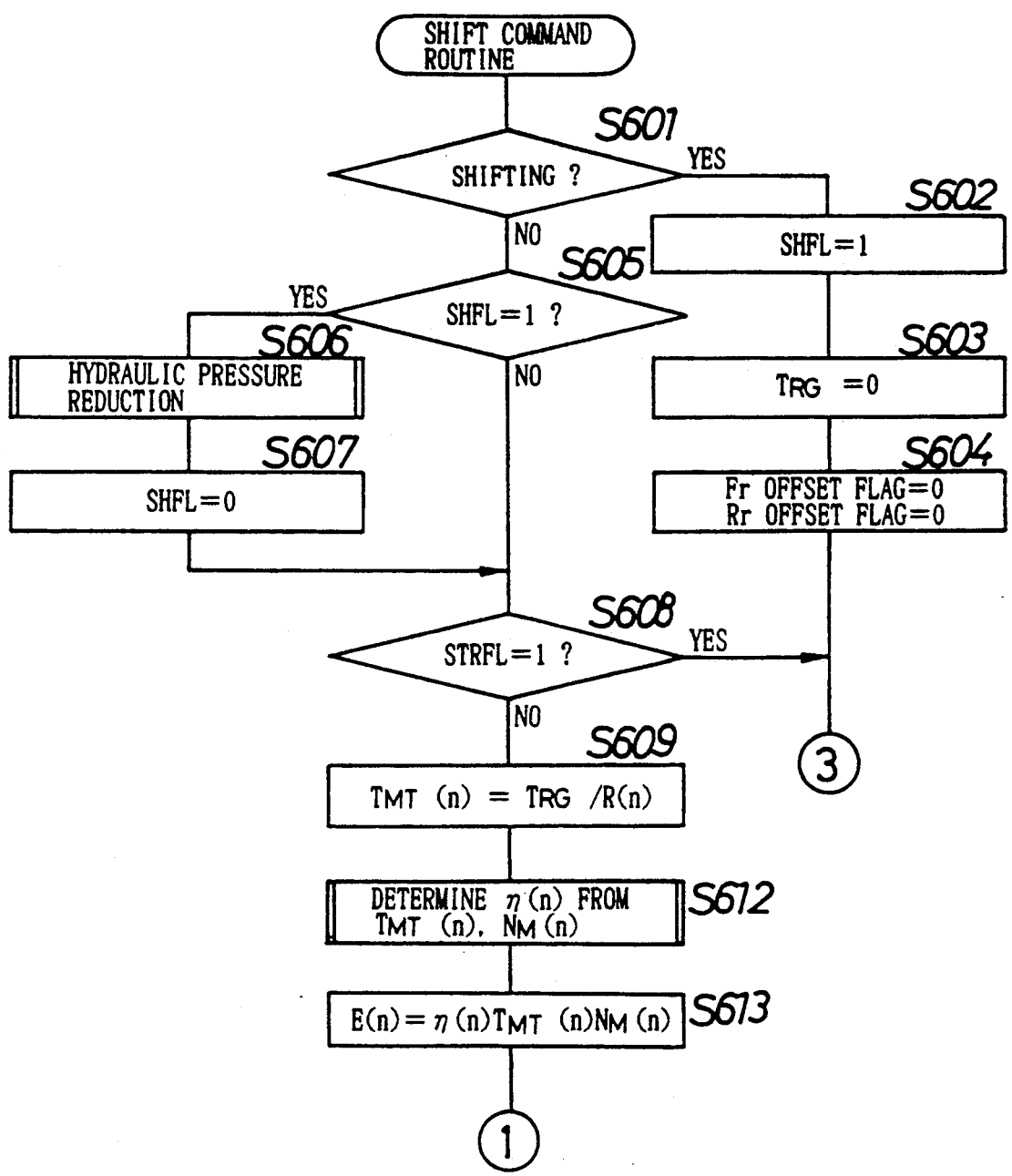

TRANSMISSION CONTROL SYSTEM IN ELECTRIC VEHICLE

BACKGROUND OF THE INVENTION

1. Field of the Invention

The present invention relates to a transmission control system in an electric vehicle in which a battery is used as an energy source for a motor and is charged with electric power generated by the motor by regenerative braking of a driving wheel connected to the motor through a transmission.

2. Description of the Prior Art

There are conventionally known transmission control systems in vehicles driven to travel by an electric motor using a battery as an energy source, in which the battery is charged with an electric power generated by the motor through regenerative braking of driving wheels, thereby prolonging the possible travel distance of the vehicle obtained by one charging (for example, see Japanese Patent Publication No. 6204/81 and U.S. Pat. No.3,621,929).

The magnitude of a regenerative energy provided by a regenerating braking varies depending upon a transmission ratio of a transmission mounted between the driving wheels and the motor. In the vehicles described in the above prior art references, however, the transmission ratio cannot arbitrarily be changed and hence, the kinetic energy of the vehicle cannot be recovered as regenerative energy without any waste, to effectively charge the battery.

SUMMARY OF THE INVENTION

Accordingly, it is an object of the present invention to increase the efficiency in recovering the energy as much as possible, by regenerative braking to prolong the possible travel distance obtained by a single battery charge, by controlling the transmission during the regenerative braking.

To achieve the above object, according to the present invention, there is provided a transmission control system in an electric vehicle in which a battery is used as an energy source for a motor and is charged with electric power generated by the motor through regenerative braking of a driving wheel which is connected to the motor through a transmission, the transmission control system comprising transmission ratio determination means for calculating a regenerative energy capable of being generated at a current transmission ratio, a regenerative energy capable of being generated when the transmission ratio is increased, and a regenerative energy capable of being generated when the transmission ratio is decreased, and comparing results of these calculations to determine a transmission ratio at which a largest regenerative energy can be obtained, and transmission control means for changing the transmission ratio of the transmission into a value permitting the largest regenerative energy to be provided, based on a transmission ratio command signal output from the transmission ratio determination means.

With the above arrangement, the transmission is operated, such that the transmission ratio permitting the largest regenerative energy to be provided is determined and obtained, by calculating the regenerative energy capable of being generated at a current transmission ratio and the regenerative energies capable of being generated when such transmission ratio is increased and decreased, and comparing these regenerative energies with one another. Therefore, it is possible to increase the efficiency of recovering the energy to the maximum to effectively charge the battery.

The present invention also has a feature that the transmission ratio determination means calculates a regenerative energy corresponding to the transmission ratio by a product of a motor efficiency, a motor torque and a motor revolution number.

With the above arrangement, a regenerative energy corresponding to each transmission ratio is calculated by a product of a motor efficiency, a motor torque and a motor revolution number, and therefore, it is possible to accurately determine a regenerative energy to perform a proper change in the transmission ratio.

The present invention has a further feature that the transmission control system further includes brake control means for discontinuing the regenerative braking and hydraulically braking the driving wheels, when the connection between the driving wheels and the motor is released in order to effect shifting based on the transmission ratio command signal.

With the above arrangement, the regenerative braking is discontinued and the driving wheel is hydraulically braked when the connection between the driving wheels and the motor is released for effecting shifting. Therefore, it is possible to prevent the magnitude of the braking force during the shifting, thereby enabling smooth braking.

Further, the present invention has a feature that the transmission ratio determination means discontinues outputting of the transmission ratio command signal during steering of the vehicle.

With the above arrangement, the outputting of the transmission ratio command signal is discontinued when the braking is conducted during steering. The behavior of the vehicle is therefore prevented from being unstabilized by the shifting during the steering.

The above and other objects, features and advantages of the invention will become apparent from the following description of preferred embodiments, taken in conjunction with the accompanying drawings.

BRIEF DESCRIPTION OF THE DRAWINGS

FIGS. 18–20 are flow charts corresponding to a subroutine of a step S600 in the main routine;

DESCRIPTION OF THE PREFERRED EMBODIMENTS

The present invention will now be described by way of preferred embodiments in connection with the accompanying drawings.

Figure 1:
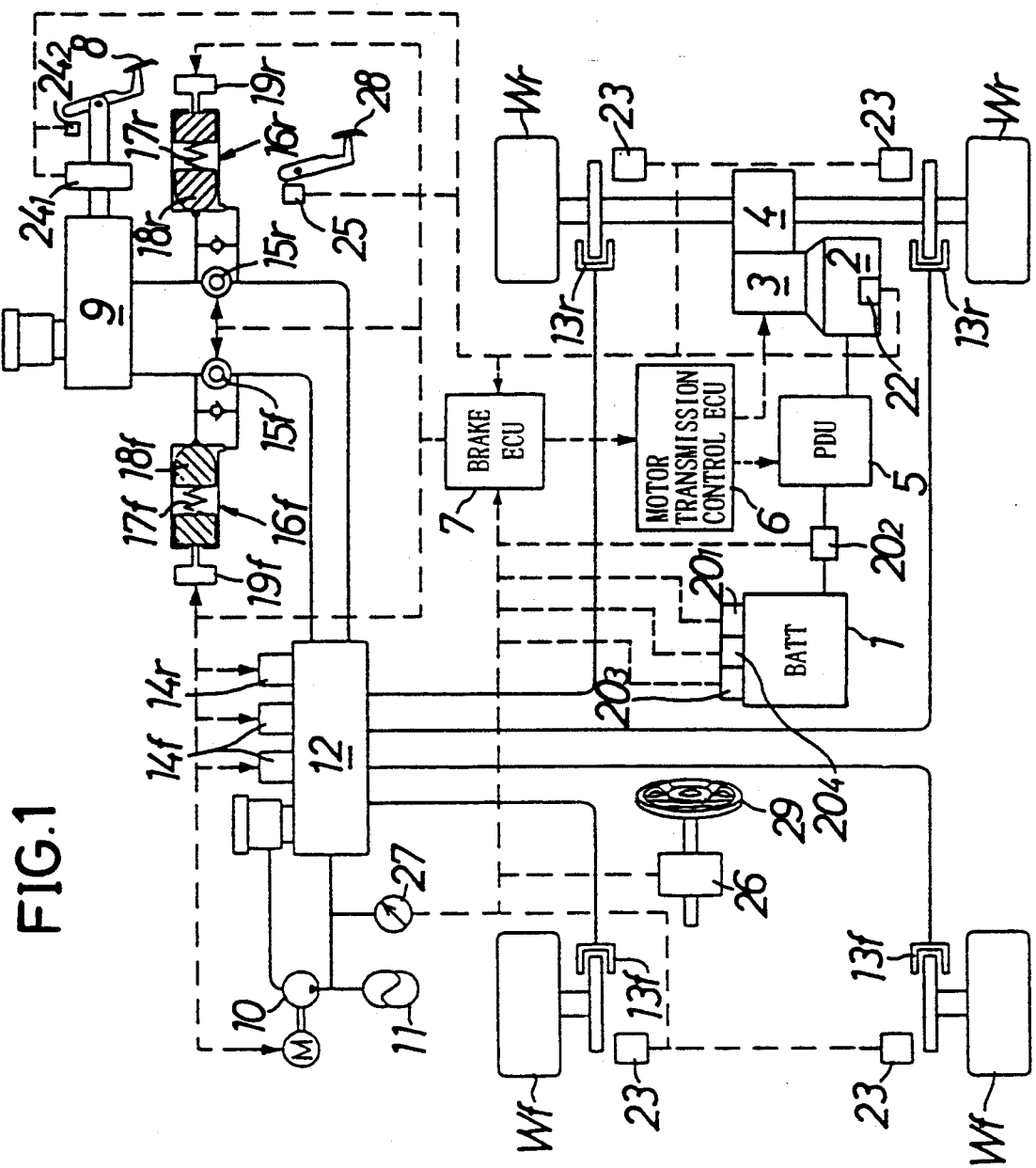
FIG. 1 is a diagram of the entire arrangement of an electric vehicle equipped with a braking system according to an embodiment.

Referring to FIG. 1, an electric vehicle of one embodiment is shown as a four-wheel vehicle having a pair of front wheels Wf as follower wheels and a pair of rear wheels Wr as driving wheels. The rear wheels Wr are connected through a forward four-stage transmission 3 and a differential 4 to an electric motor 2 with a battery 1 used as an energy source. A PDU (power drive unit) 5 is interposed between the battery 1 and the motor 2 to control the driving of the motor 2 by the battery 1 and to control the charging of the battery 1 with electric power generated by the motor 2 as a result of regenerative braking operations. The PDU 5 and the transmission 3 are connected to a motor/transmission control ECU (electronic control unit) 6 which is connected to a brake ECU (electronic control unit) 7.

A master cylinder 9 is operable by a brake pedal 8 and is connected to respective brake cylinders 13f for the front wheels Wf and to respective brake cylinders 13r for the rear wheels Wr through a modulator 12 connected to an accumulator 11 which accumulates pressure generated by a hydraulic pump 10. The modulator 12 includes two-channel ABS (antilock brake system) control valves 14f for the front wheels and a one-channel ABS control valve 14r for the rear wheels, so that when a locking tendency is produced in the front and rear wheels Wf and Wr, the hydraulic braking pressure transmitted to the brake cylinders 13f and 13r is reduced.

Provided in respective oil passages connecting the master cylinder 9 and the modulator 12 are a hydraulic pressure control valve arrangement comprised of a differential pressure control valve 16f and an ON/OFF valve 15f for controlling the hydraulic braking pressure transmitted to the brake cylinders 13f for the front wheels Wf, and a hydraulic pressure control valve arrangement comprised of a differential pressure control valve 16r and an ON/OFF valve 15r for controlling the hydraulic braking pressure transmitted to the brake cylinders 13r for the front wheels Wr.

The ON/OFF valve 15f for the front wheels is a normally-opened type on/off valve driven by a solenoid and adapted to cut off the communication between the master cylinder 9 and the modulator 12, when required. The differential pressure control valve 16f for the front wheels is mounted in a bypass oil passage bypassing the ON/OFF valve 15f and comprises a valve member 18f biased in an opening direction by a spring 17f, and a linear solenoid 19f for adjusting the set load of the spring 17f. The ON/OFF valve 15r and the differential pressure control valve 16r for the rear wheels have the same structures as those for the front wheels, respectively. Moreover, a one-way valve is provided in the bypass oil passage for restraining feeding of the hydraulic pressure from the master cylinder 9 to the modulator 12, but permitting feeding of the hydraulic pressure from the modulator 12 to the master cylinder 9.

Figure 2:
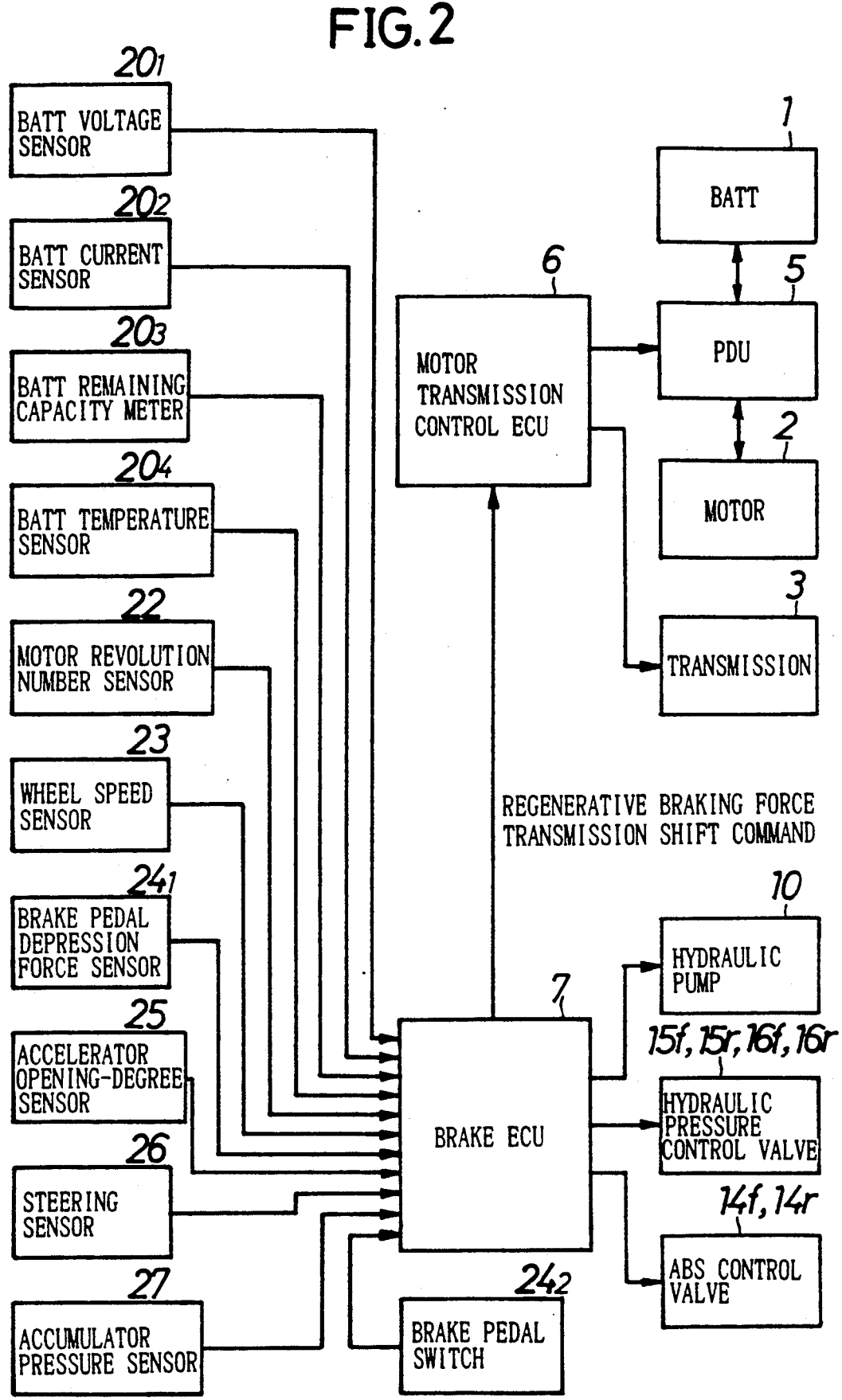
FIG. 2 is a block diagram of a control system.

As can be seen from FIG. 1 together with FIG. 2, connected to the brake ECU 7 are a battery voltage sensor $20_1$, a battery current sensor $20_2$, a battery remaining-capacity meter $20_3$, and a battery temperature sensor $20_4$ which are mounted on the battery 1; a motor revolution number sensor 22 for detecting the number of revolutions of the motor 2; wheel speed sensors 23 mounted on the front and rear wheels Wf and Wr, respectively; a brake pedal depression force sensor $24_1$, and a brake pedal switch $24_2$ mounted on the brake pedal 8; an accelerator opening degree sensor 25 mounted on the accelerator pedal 28; a steering sensor 26 mounted on a steering wheel 29; and an accumulator pressure sensor 27 mounted on the accumulator 12. Further, connected to the brake EPU 7 are the hydraulic pump 10, the hydraulic pressure control valve arrangements each comprised of the ON/OFF valve 15f, 15r and the differential pressure control valve 16f, 16r, and the ABS control valves 14f and 14r, all of which are controlled based on output signals from the above described sensors.

The PDU 5 for controlling the battery 1 and the motor 2 and the transmission 3 are connected to the motor/transmission control ECU 6 which is operated with a regenerative braking command and a transmission shift command output from the brake ECU 7.

The outline of various braking modes will be described with reference to FIG. 3.

The braking modes for the front and rear wheels Wf and Wr in the vehicle equipped with the braking system according to this embodiment include three types: "mode 1", "mode 2" and "mode 3". Any one of these modes is selected by an initial decision, so that the braking is carried out in the selected mode, and in response to a change in the operational condition of the vehicle, the changing of the mode is carried out.

(1) Mode 3

This mode is selected in a usual operational condition. More specifically, this mode is selected when a regenerative braking system is normally operative and when a hard or intense braking is not conducted and the steering wheel is not steered. The mode 3 is a mode in which the front wheels Wf are braked by the hydraulic pressure, and the rear wheels Wr are braked by the hydraulic pressure and by the regeneration. In this mode, when the brake pedal 8 is depressed, firstly, only the rear wheels Wr are braked in a regenerative manner, while the hydraulic braking of the front wheels Wf is not performed. When the braking force for the rear wheels Wr reaches a fold point P, the hydraulic braking of the front wheels Wf is started from this instant. When the braking force for the rear wheels Wr exceeds a regenerative limit determined from various conditions for the battery 1 and the motor 2, the rear wheels Wf are braked by combination of the regeneration with the hydraulic pressure. When the braking force for the rear wheels Wr reaches a fold point Q, the braking force is reduced by an action of a well-known proportional reduction valve mounted within the modulator 12. Eventually, a braking force distribution characteristic shown by a fold line OPQR is provided. This braking force distribution characteristic OPQR is offset upwardly of a theoretical or ideal distribution characteristic shown by a dashed line. In other words, the braking force distribution for the rear wheels Wr lies upwardly of the theoretical distribution characteristic. This ensures that the battery 1 can be charged by utilizing as much the regenerative braking of the rear wheels Wr as possible, thereby providing prolongation in a possible travel distance obtained by one charge. In the mode 3, however, only for an extremely short time, immediately after starting of the braking operation, the front wheels Wf are braked by the hydraulic pressure and the rear wheels Wr are braked by combination of the regeneration with the hydraulic pressure. If it is confirmed that there is no abnormality in the braking device for such period of time, the braking by the hydraulic pressure is then immediately stopped, and the rear wheels Wr are braked only by the regeneration.

(2) Mode 2

This mode is selected when the regenerative braking system normally functions with a hard braking being not conducted but with the steering wheel being steered. Like the above-described mode 3, the mode 2 is a mode in which the front wheels Wf are braked by the hydraulic pressure and the rear wheels Wr are braked by the hydraulic pressure and the regeneration. However, if the brake pedal 8 is depressed down, the hydraulic braking of the front wheels Wf is performed simultaneously with and in parallel to the regenerative braking of the rear wheels Wr. If the braking force for the rear wheels Wr exceeds the regenerative limit during such braking, the rear wheels Wr are then braked by combination of the hydraulic pressure with the regeneration. When the braking force reaches a fold line R, the braking force for the rear wheels Wr is reduced by means of the proportional reduction valve. A fold line OQR representing the resulting braking force distribution characteristic places more weight on the braking force for the front wheels Wf than that placed by the theoretical distribution characteristic shown by the dashed line. In this way, it is possible to avoid a reduction in the handling stability by selecting the mode 2 during steering and braking the front and rear wheels Wf and Wr simultaneously from the initial stage of braking.

(3) Mode 1

This mode is selected when the regenerative braking system does not normally function, or during a hard braking when the regenerative braking system normally functions. In this mode 1, the regenerative braking of the rear wheels Wr is not performed, and both the front and rear wheels Wf and Wr are braked by the hydraulic pressure. By performing only the hydraulic braking without the regenerative braking of the rear wheels Wr in this manner, it is possible to enhance the responsiveness in application of the braking force, as compared with the regenerative braking wherein a slight delay in responsiveness may be produced while the rotation of the rear wheels Wr is being transmitted through the differential 4 and the transmission 3 to the motor 2. The braking force distribution characteristic shown by the fold line OQR places more weight on the braking force for the front wheels Wf than that placed by the theoretical distribution characteristic shown by the dashed line as in the above-described mode 2. The responsiveness of the braking is improved by selecting the mode 1 during hard braking, as described above.

When hard braking is effected during the braking operation according to the mode 3, the mode change from the mode 3 to the mode 1 is achieved. On the other hand, when a steering operation is conducted during the braking according to the mode 3, or when a wheel locking tendency due to a low friction coefficient (low $\mu$) is detected, the mode change from the mode 3 to the mode 2 is performed. When a further marked wheel-locking tendency due to a low $\mu$ road is detected during the braking according to the mode 2, the mode change from the mode 2 to the mode 1 is performed. In this way, by selecting the mode 2 or the mode 1 depending upon the friction coefficient ($\mu$) of the road surface, it is possible to avoid a reduction in handling stability. The mode change from the mode 3 to the mode 2 or to the mode 1 is carried out in alignment with an equal braking force line, i e., along a line showing that a sum of the braking force for the front wheels Wf and the braking force for the rear wheels Wr is kept constant, thereby avoiding a sudden variation in total braking force for the front and rear wheels Wf and Wr.

Figure 4:
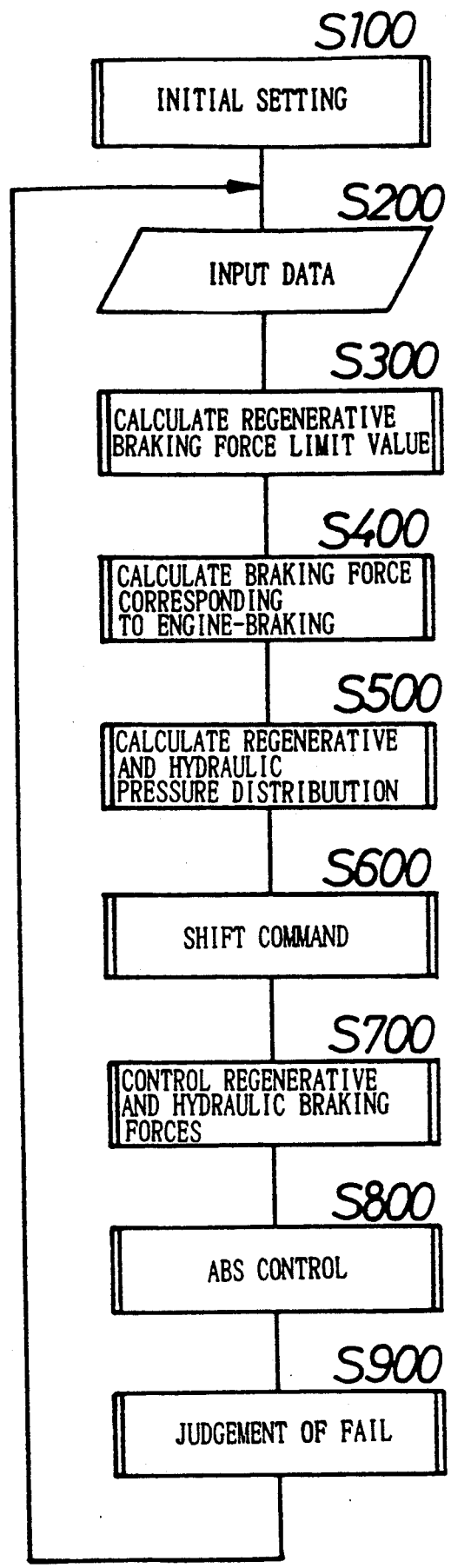
FIG. 4 is a flow chart of a main routine.

The operation of the braking system having the above-described construction will be described with reference to a flow chart of a main routine shown in FIG. 4.

First, at a step S100, various programs and data are stored in memories in the brake ECU 7 and the motor/-transmission control ECU 6, and the braking system is initially set in an operable state. At a subsequent step S200, output signals from the battery voltage sensor $20_1$, the battery current sensor $20_2$, the battery remaining-capacity meter $20_3$, the battery temperature sensor $20_4$, the motor revolution-number sensor 22, the wheel speed sensors 23, the brake pedal depression force sensor $24_1$, the brake pedal switch $24_2$, the accelerator opening degree sensor 25, the steering sensor 26 and the accumulator pressure sensor 27 are read into the brake ECU 7 (see FIG. 2).

At a step S300, a limit value of the regenerative braking force capable of being exhibited at each instance is calculated based on the output signals from the above described various sensors. The limit of the regenerative braking force depends upon the state of the battery 1 and/or the state of the motor 2, and the details thereof will be described hereinafter with reference to a subroutine of the step S300.

At a step S400, a regenerative braking force corresponding to an engine-braking is calculated. In a vehicle using an internal combustion engine as a travel power source, if the depressing force on the accelerator pedal is released, an engine-braking is applied. In a vehicle using a motor 2 as a travel power source as in this embodiment, a braking force corresponding to the engine-braking is applied to the rear wheels Wr by a regenerative braking, thereby providing a steering feeling similar to that in a usual vehicle having an internal combustion engine. More specifically, if the depressing force on the accelerator pedal 28 is weakened, a braking force corresponding to the engine-braking is calculated based on the accelerator opening degree detected by the accelerator opening degree sensor 25, the motor revolution number detected by the motor revolution number sensor 22 and the wheel speeds detected by the wheel speed sensors 23. In order to provide such braking force, the wheels Wr connected to the motor 2 are regeneratively braked. An electric power generated by the motor 2 as a result of the regenerative braking is supplied for the charging of the battery.

At a step S500, a distribution ratio of the regenerative braking force to the hydraulic braking force is calculated. In other words, the mode 3, 2 or 1 is selected, and depending upon conditions of the braking and steering operations conducted by a driver, or the friction coefficient, a change in mode from the mode 3 to the mode 2 or the mode 1 may be determined. In each of the modes, the magnitude of the hydraulic braking force for the front wheels Wf and the magnitudes of the regenerative braking force and the hydraulic braking force for the rear wheels Wr are calculated. The detailed content of the step S500 will be described hereinafter with reference to a subroutine of the step S500.

At a step S600, a shift position capable of exhibiting the regenerative braking force to the maximum is calculated, and the transmission 3 is automatically operated toward such shift position. The detailed content of the step S600 will be described hereinafter with reference to a subroutine of the step S600.

At a step S700, the ON/OFF valves 15f and 15r and the differential pressure control valves 16f and 16r shown in FIG. 1 are actually controlled in order to distribute the regenerative braking force and the hydraulic braking force at a predetermined ratio. An electric power generated by the motor 2 as a result of the regenerative braking of the rear wheels Wr is supplied for the charging of the battery 1. The detailed content of the step S700 will be described hereinafter with reference to a subroutine of the step S700.

At a step S800, an antilock control is performed to prevent an excessive slip of the front wheels Wf or the rear wheels wr. More specifically, if it is detected by the output signal from the wheel speed sensor 23 that a wheel begins to come into a locked state, the ABS control valves 14f and 14r shown in FIG. 1 are controlled. This causes the modulator 12 interposed between the master cylinder 9 and the brake cylinders 13f and 13r to be operated, thereby reducing the hydraulic braking pressure transmitted to the braking cylinder 13f, 13r for the wheel which is in the locking tendency, thus preventing the locking of the wheel.

At a step S900, failure of the braking system is detected. If it is decided that any failure has occurred, then the normally-opened type ON/OFF valves 15f and 15r are maintained at their opened position, thereby permitting the master cylinder 9 and the modulator 12 to be put into direct communication with each other. As a result, the mode 1 is selected unconditionally, so that the front and rear wheels Wf and Wr are braked by the hydraulic pressure as in a usual hydraulic braking system.

The detailed content of the step S300 (the calculation of the limit value of the regenerative braking force) in the flow chart shown in FIG. 4 will be described below with reference to FIGS. 5 to 8.

Figure 5:
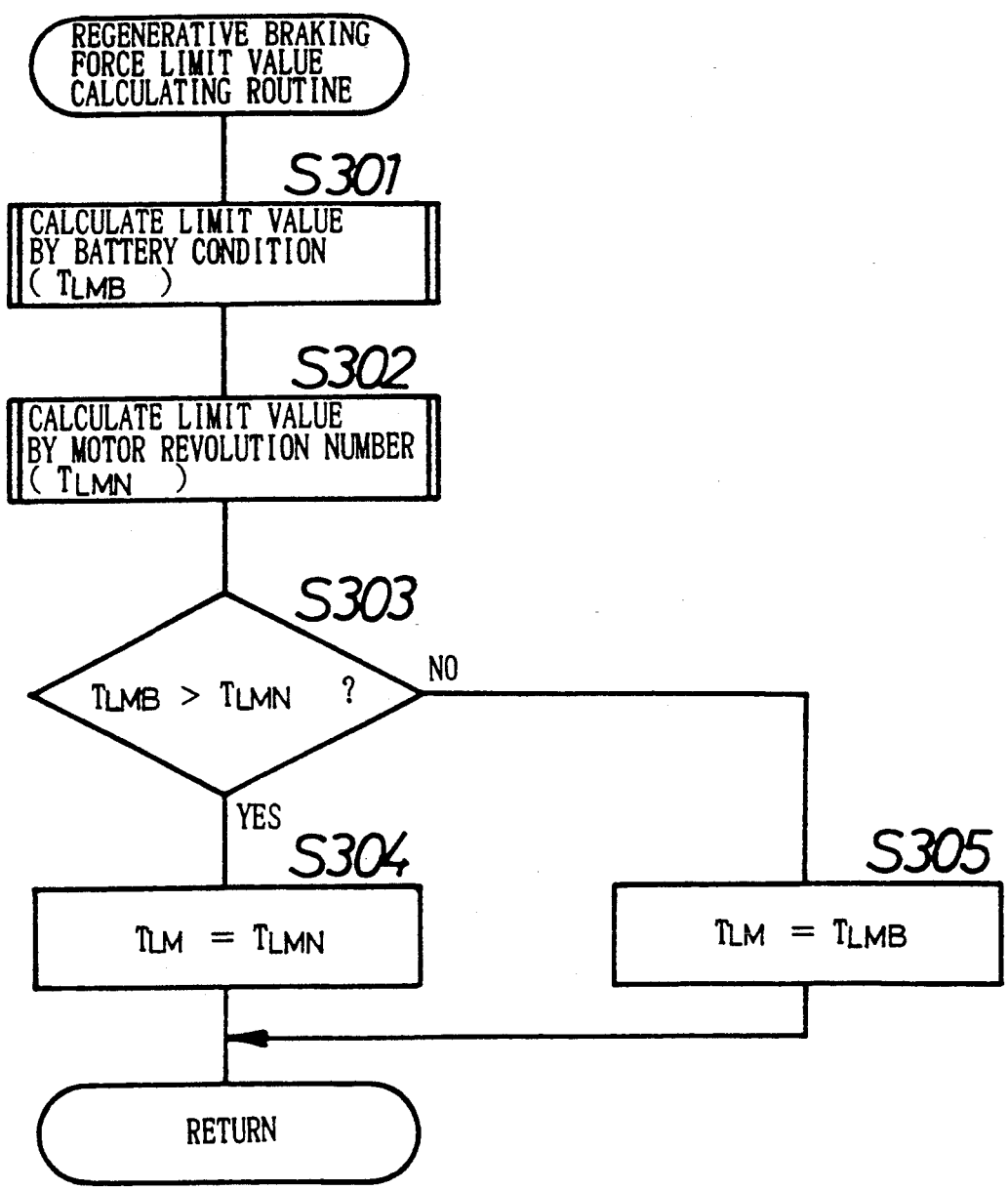
FIG. 5 is a flow chart of a subroutine corresponding to a step S300 in the main routine.

As shown in a routine for calculation of the limit value of the regenerative braking force in FIG. 5, a limit value $T_{LMB}$ of the regenerative braking force based on the state of the battery 1 is first calculated at a step S301, and then, a limit value $T_{LMN}$ of the regenerative braking force based on the number of revolutions of the motor 2 is calculated at a step S302. The magnitudes of the limit value $T_{LMB}$ and the limit value $T_{LMN}$ are compared at a step S303. If the limit value $T_{LMB}$ is larger than the limit value $T_{LMNH}$, the smaller limit value $T_{LMN}$ is selected as a regenerative braking force limit value $T_{LM}$ at a step S304. If the limit value $T_{LMB}$ is equal to or smaller than the limit value $T_{LHN}$ the smaller limit value $T_{LMB}$ is selected as the regenerative braking force limit value $T_{LM}$ at a step S305. In other words, the regenerative braking force limit value $T_{LM}$ is determined by smaller one of the limit value $T_{LMB}$ based on the state of the battery 1 and the limit value $T_{LMS}$ based on the number of revolutions of the motor 2.

Figure 6:
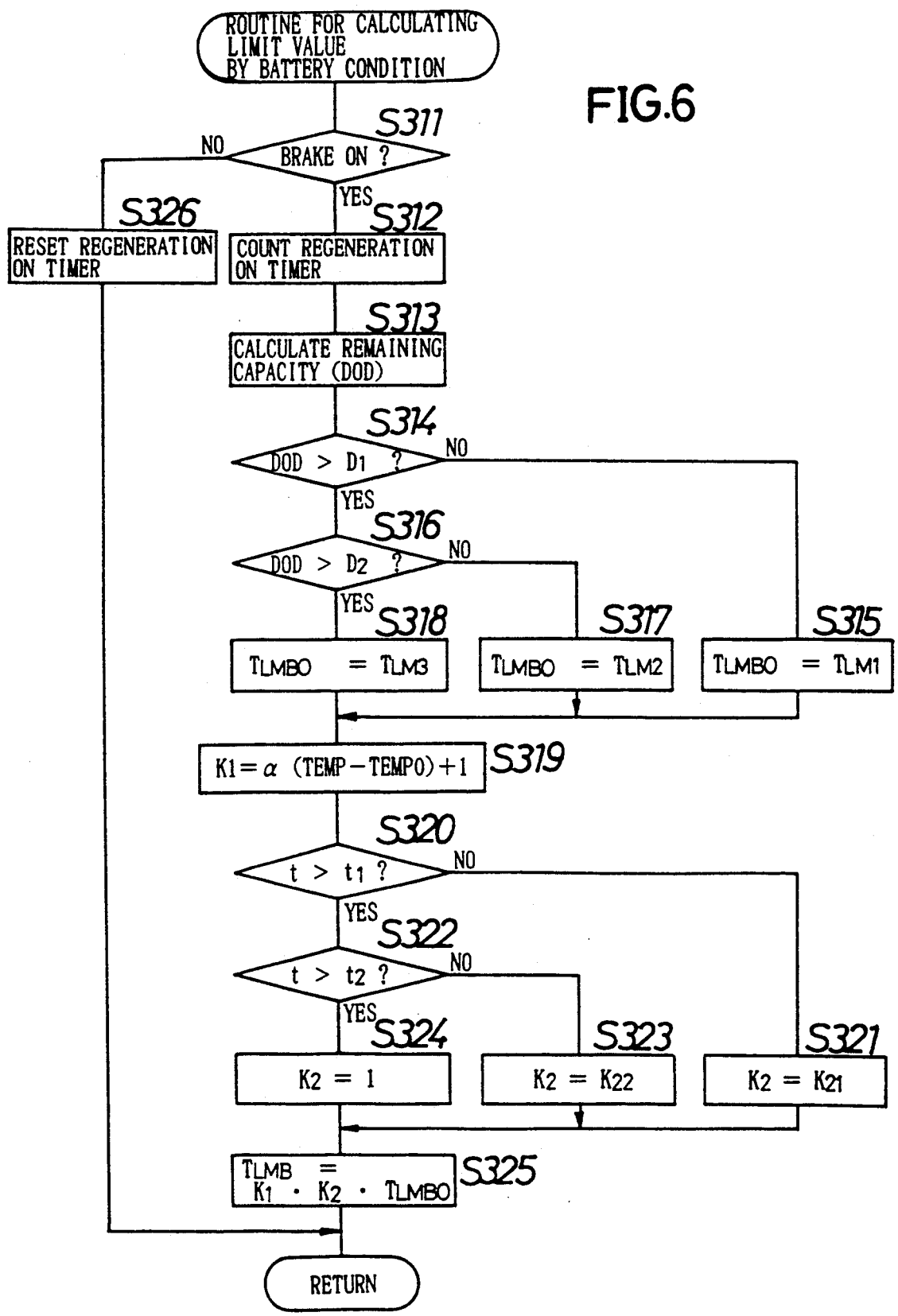
FIG. 6 is a flow chart of a subroutine corresponding to a step S301 shown in FIG. 5.

A subroutine of the step S301 (the calculation of the limit value based on the state of the battery) in FIG. 5 will be described below with reference to FIG. 6.

If it is detected, at a step S311, by the output signal from the brake pedal depression-force sensor $24_1$, that the braking operation has been performed, a regenerative ON timer RBT starts counting at a step S312. Then, a depth of discharge (DOD) of the battery 1 is calculated based on the output signal from the battery remaining-capacity meter $20_3$ at a step S313.

At subsequent steps S314 to S318, a limit value $T_{LMBO}$ is determined based on the magnitude of the DOD. More specifically, if the value of DOD is small, and the remaining capacity of the battery 1 is large, the limit value $T_{LMBO}$ is set at a small level. If the value DOD is large and the remaining capacity of the battery 1 is small, the limit value $T_{LMBO}$ is set at a large level. This will be described in detail with reference to FIG. 6 together with FIG. 7A. If the DOD is equal to or less than a threshold value $D_1$ and the remaining capacity of the battery 1 is relatively large, then the limit value $T_{LMBO}$ is set at a relatively small level $T_{LMBI}$. If the DOD is equal to or less than a threshold value $D_2$ and the remaining capacity of the battery 1 is relatively small, then the limit value $T_{LMBO}$ is set at a relatively large level $T_{LMB3}$. the DOD is between the threshold values $D_1$ and $D_2$, the limit value $T_{LMBO}$ is set at a limit value $T_{LMB2}$ which is between the value $T_{LMBI}$ and the value $T_{LMB3}$.

Figure 7A:
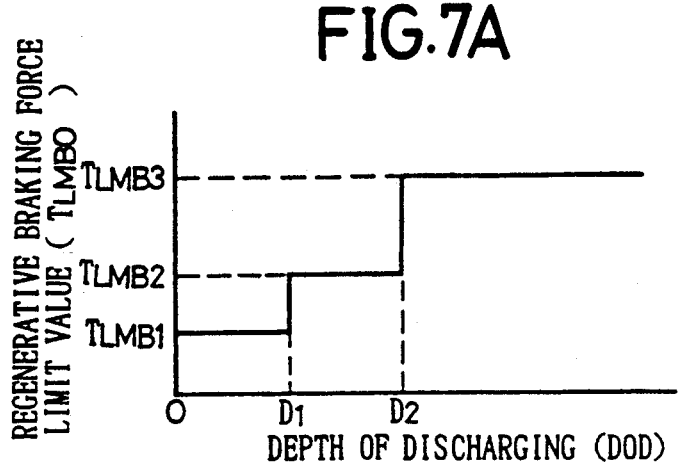
FIGS. 7A, 7B and 7C are graphs attendant on the flow chart shown in FIG. 6.
Figure 7B:
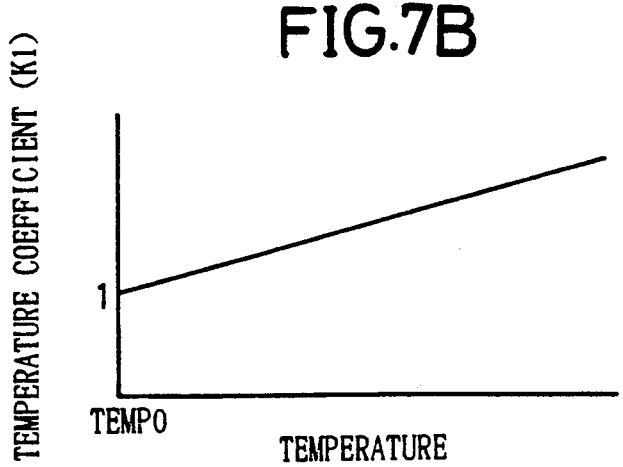
Figure 7C:
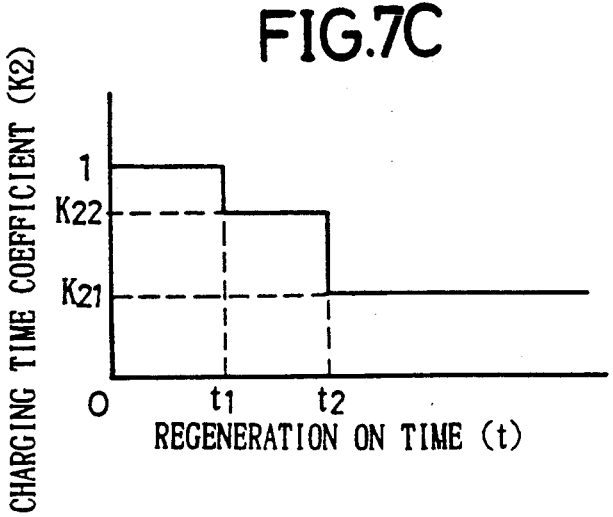

At a next step S319, a coefficient $K_1$ for correcting the limit value $T_{LMBO}$ based on the output signal from the battery temperature sensor 21 is determined. More specifically, the capacity of the battery 1 increases with higher temperature and hence, the temperature coefficient $K_1$ is set equal to a value which increases linearly from 1 as the output signal TEMP from the battery temperature sensor 21 exceeds $TEMP_O$, as shown in FIG. 7B.

At subsequent steps S320 to S324, a coefficient $K_2$ for correcting the limit value $T_{LMBO}$ based on the magnitude of the regenerative ON time t counted by the regenerative ON timer RBT is determined. As is apparent from FIG. 7C, if the regenerative ON time t which is a time lapsed from the start of the regenerative braking is equal to or less than a threshold value $t_1$, the charging time coefficient $K_2$ is set at 1. If the regenerative ON time t exceeds the threshold value $t_1$, the charging time coefficient $K_2$ is set at $K_{22}$ which is smaller than 1. If the regenerative ON time t is equal to or more than a threshold value $t_2$, the charging time coefficient $K_2$ is set at $K_{21}$ which is even smaller than $K_{22}$. In this way, the charging time coefficient $K_2$ becomes the maximum value of 1 at an initial stage of the charging of the battery 1 performed efficiently, and with the lapse of the regenerative ON time t, the charging time coefficient $K_2$ decreases from 1 to $K_{21}$ and $K_{22}$.

At a step S325, a final regenerative braking force limit value $T_{LMB}$ based on the battery 1 is calculated by multiplying the limit value $T_{LMBO}$ based on the DOD by the temperature coefficient $K_1$ and the charging time coefficient $K_2$.

The calculation of the regenerative braking force limit value $T_{LMB}$ is carried out at every time when the brake pedal 8 is depressed. When the depressing force on the brake pedal 8 is released, the regenerative ON timer is reset at a step S326.

Figure 8:
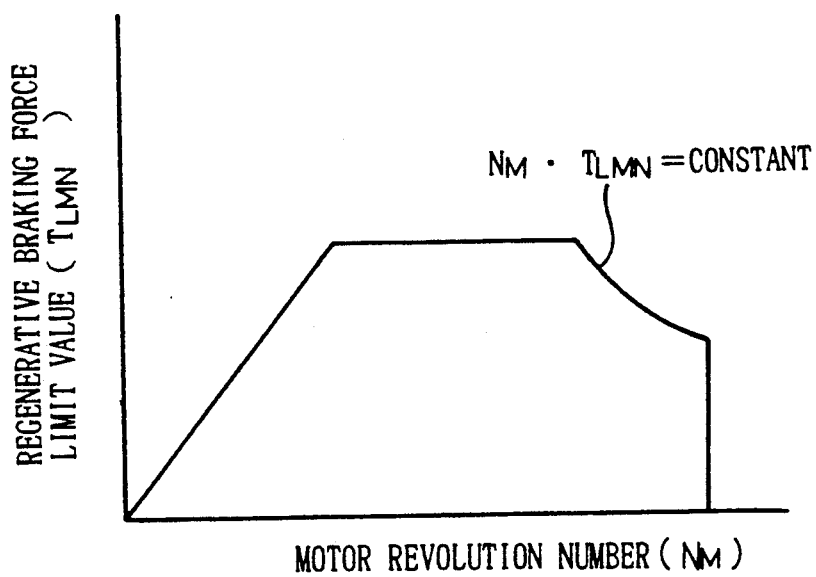
FIG. 8 is a graph attendant on the flow chart shown in FIG. 5.

FIG. 8 illustrates the variation in limit value $T_{LMN}$ of the regenerative braking force based on the output signal $N_M$ from the motor revolution-number sensor 22, which corresponds to the step S302 in the flow chart shown in FIG. 5. As apparent from FIG. 8, the limit value $T_{LMN}$ increases linearly with the increase in number $N_M$ of revolutions of the motor 1, becomes substantially constant soon, and is then decreased rapidly.

The detailed content of the step S500 (the calculation of the regenerative and hydraulic distribution) in the flow chart shown in FIG. 4 will be described below with reference to FIGS. 9 to 17.

Figure 9:
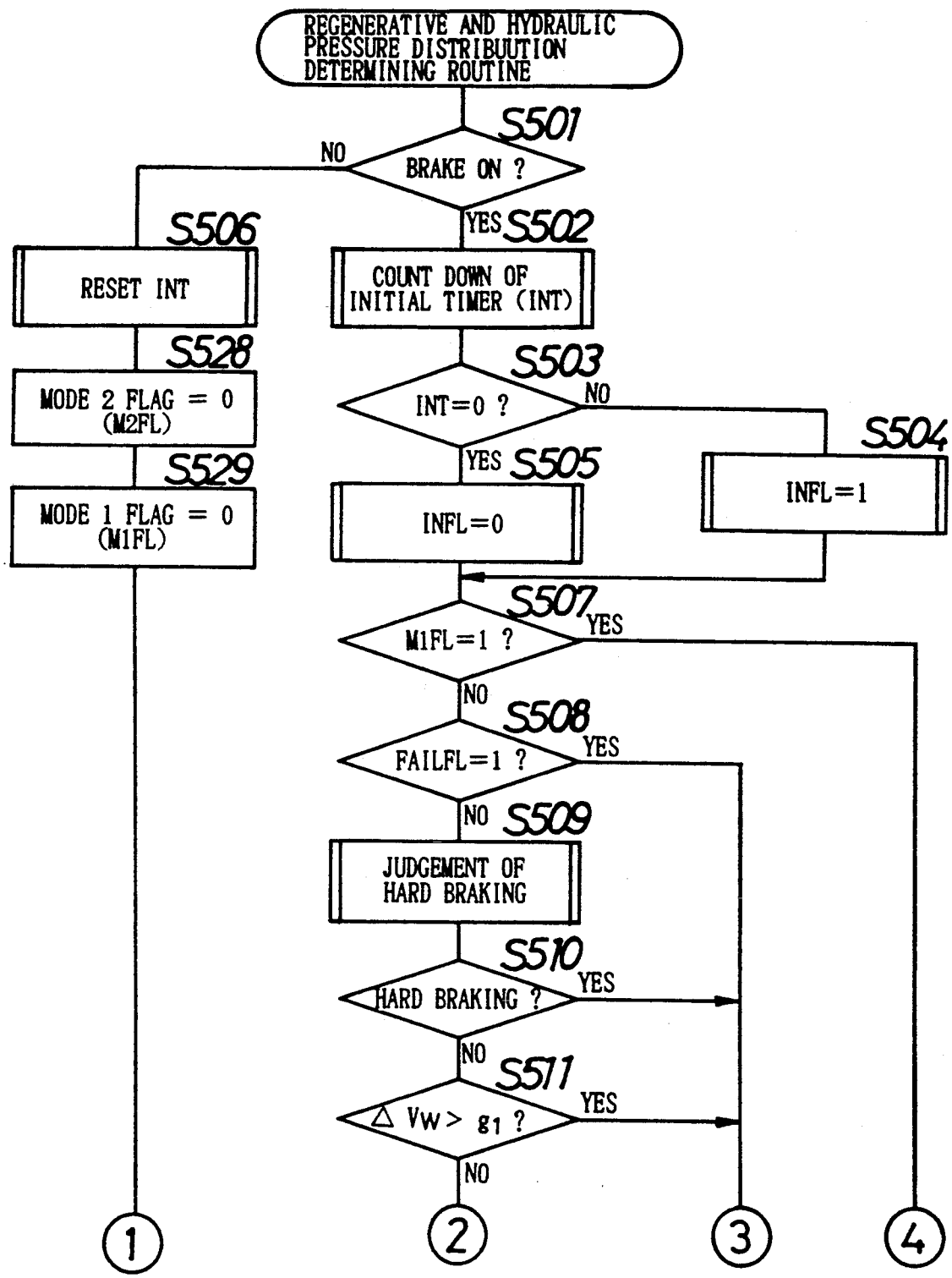
FIG. 9 is a flow chart of a subroutine corresponding to a step S500 in the main routine.
Figure 10:
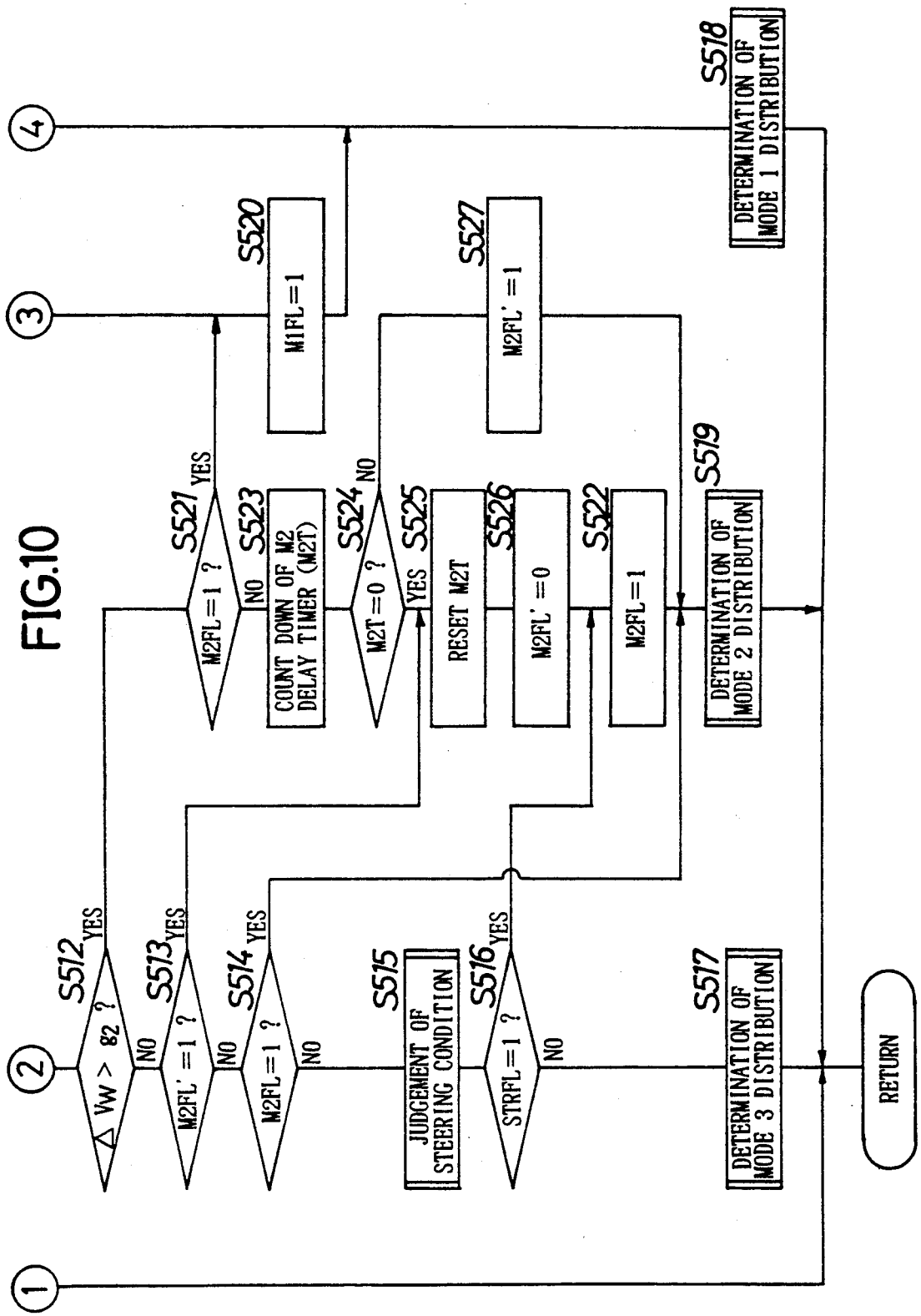
FIG. 10 is a flow chart of subroutine corresponding to a step S500 in the main routine.

As shown in the regenerative and hydraulic distribution determination routine in FIGS. 9 and 10, if the brake pedal switch $24_2$ is turned ON by the start of the braking operation at a step S501, an initial timer INT starts a count-down at a step S502. Then, until a predetermined time is lapsed, an initial flag INFL is set at "1" at a step S503, and after the lapse of the predetermined time, the initial flag INFL is set at "0 (zero)" (at steps S503, S504 and S505). When the brake pedal switch $24_2$ is turned OFF at the step S501, the initial timer INT is reset at a step S506.

Now, the mode 3 is selected at a step S517 in a non-steering condition wherein; a mode-1 flag is "0" and the mode 1 is not selected at a step S507; the regenerative braking system is not out of order at a step S508; a hard braking is not applied at steps S509 and S510; the friction coefficient μ of a road surface is sufficiently large at steps S511 and S512 to causes no wheel locking tendency and as a result, the time-differentiation value $\Delta V_W$ of the wheel speed (falling of the wheel speed per unit time) of calculated from the output signal from the wheel speed sensor 23 is equal to or less than predetermined threshold values $g_1$ and $g_2$ ($g_1 > g_2$); both of a temporary mode-2 flag M2FL' and a mode-2 flag M2FL are "0' and the mode 2 is not selected at steps S513 and S514; and a steering flag STRFL is not set at "1" at steps S515 and S516. If the mode-1 flag is set at "1" at the step S507, the mode-1 is selected at the step S518. If the mode-2 flag M2FL is set at "1" at the step S514, the mode-2 is selected at the step S519.

The mode-1 flag MLFL for selecting the mode 1 is set at "1" at a step S520, when any one of the following conditions (1) to (4) is established:

(1) The case where the regenerative braking system is out of order at the step S508;
(2) The case where it is decided at the steps S509 and S510 that a hard braking has been applied;
(3) The case where the time-differentiation value $\Delta V_w$ of the wheel speed exceeds the larger threshold value $g_1$ at the step S511 ($g_1$ is selected as a value which is evaluated when a wheel is about to become locked, even in a braking force distribution of a usual hydraulic braking system); and
(4) The case where the time-differentiation value {$V_w$ of the wheel speed is between the larger threshold value $g_1$ and the smaller threshold value $g_2$ ($g_2$ is selected as a value which is evaluated when the locking tendency is eliminated, if the braking force distribution characteristic is returned to the braking force distribution of the usual hydraulic braking system), and where the mode-2 flag M2FL is set at "1" at the step S521.

The temporary mode-2 flag M2FL' for deciding the selection of the mode 2 is set at "1" at a step S527, when the following condition (5) is established, and likewise, the mode-2 flag M2FL is set at "1" at a step S522, when the following condition (6) or (7) is established:

(5) The case where the time-differentiation value $\Delta V_w$ of the wheel speed exceeds the smaller threshold value $g_2$ at the step S512, and the mode-2 flag M2FL is not set at "1" at the step S521 (i.e., a state in which the mode 3 has been selected), and moreover, a M2 direct timer M2T is counting down at steps S523 and S524;
(6) The case where the time-differentiation value $\Delta V_w$ of the wheel speed becomes equal to or less than the smaller threshold value $g_2$ at the step S512 during counting-down of the M2 direct timer M2T at steps S523 and S524 (i.e., M2FL'=1), or a predetermined time counted by the M2 direct timer M2T is lapsed. It should be noted that even after the lapse of the predetermined time counted by the M2 direct timer M2T, if it is decided at the step S512 that $\Delta V_w > g_2$, the mode 1 is selected based on the above-described condition (4); and
(7) The case where it is decided at the steps S515 and S516 that the steering is being conducted.

Both of the mode-2 flag M2FL and the mode-1 flag MLFL are not set at "0" at steps S528 and S529, until it is decided at the step S510 that the braking operation is not conducted, i.e., until the depressing force on the brake pedal 8 is released. Therefore, once the mode 2 or the mode 1 is selected during one braking, the mode cannot be shifted back from the mode 2 or 1 to the mode 3 during such braking.

Figure 11:
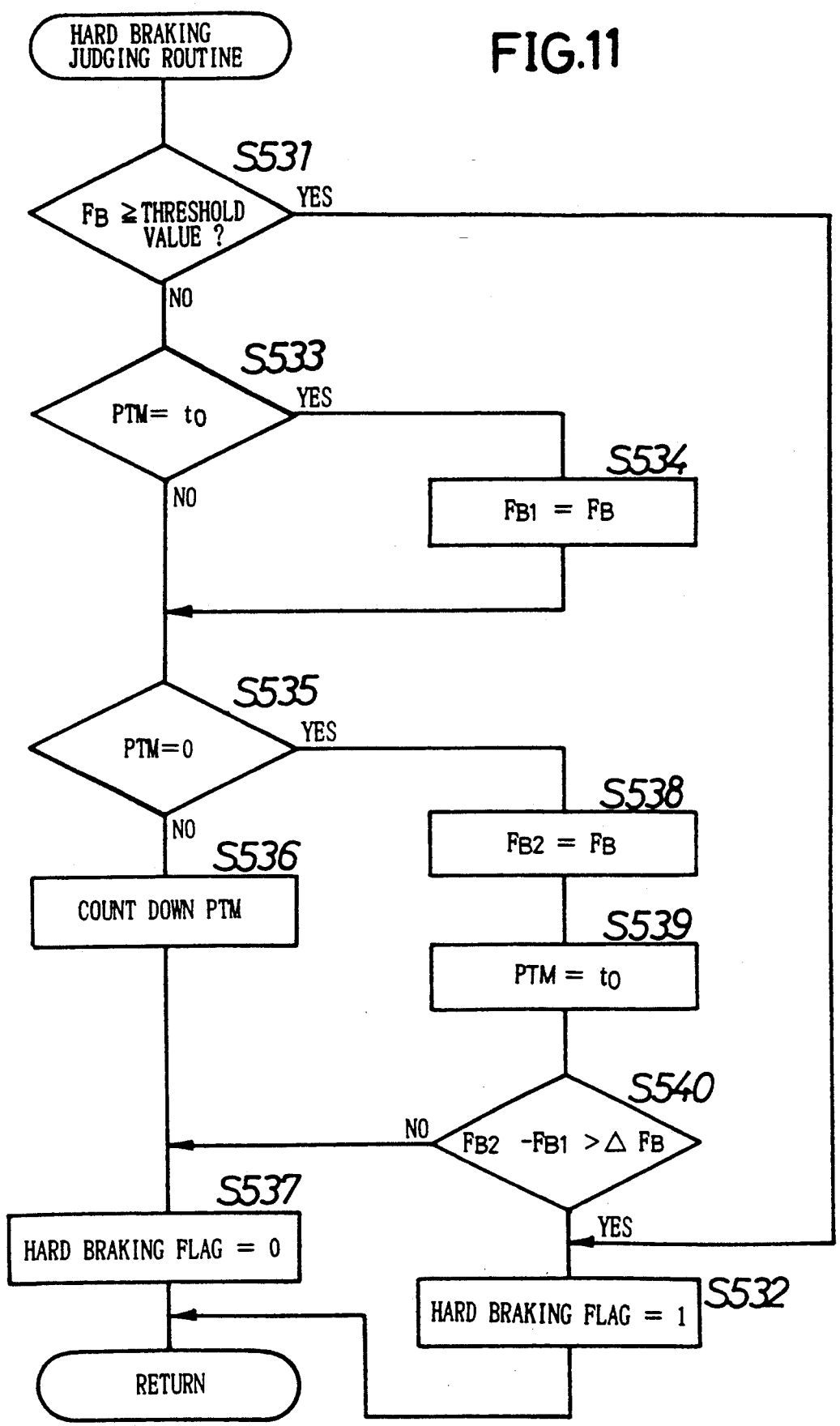
FIG. 11 is a flow chart corresponding to a subroutine of a step S509 shown in FIG. 9.

The detail of the step S509 (judgement of the hard braking) in FIG. 9 will be described below with reference to a flow chart shown in FIG. 11. If the depression force $F_B$ detected by the brake pedal depression force sensor $24_1$ is equal to or more than a predetermined threshold value at a step S531, it is decided unconditionally that the hard braking is being applied, and a hard-braking flag is set at "1" at a step S532.

On the other hand, if the depression force $F_B$ is less than the predetermined threshold value and a hard-braking judging timer PTM is at an initial value $t_0$ at the start of counting, the current depression force $F_B$ is brought into an initial depression force $F_{B1}$ at a step S534. If the hard-braking judging timer PTM does not count down to 0 (zero) at a subsequent step S535, the count-down is performed at a step S538, and the hard-braking flag is set at "0" at a step S537.

When the hard-braking judging timer PTM completes the countdown to 0 (zero) at the step S535, i.e., when the predetermined time $t_0$ is lapsed, the current depression force $F_B$ is brought into a $t_0$-later depression force $t_{B2}$ at a step S538, and the hard-braking judging timer PTM is reset at $t_0$ at a step S539. At a next step S540, a difference between the $t_0$-later depression force $t_{B2}$ and the initial depression force $F_{B1}$ is compared with a threshold value $\Delta F_B$ of variation in depression force. If the difference exceeds the depression force variation threshold value $\Delta F_B$, the hard-braking flag is set at "1". If the difference does not exceed the depression force variation threshold value $\Delta F_B$, the hard-braking flag is set at "0".

In this way, if the depression force $F_B$ exceeds a first threshold value, and if an increment in depression force $F_B$ within a predetermined time exceeds a second threshold value, then it is decided that the hard braking is being applied.

Figure 12:
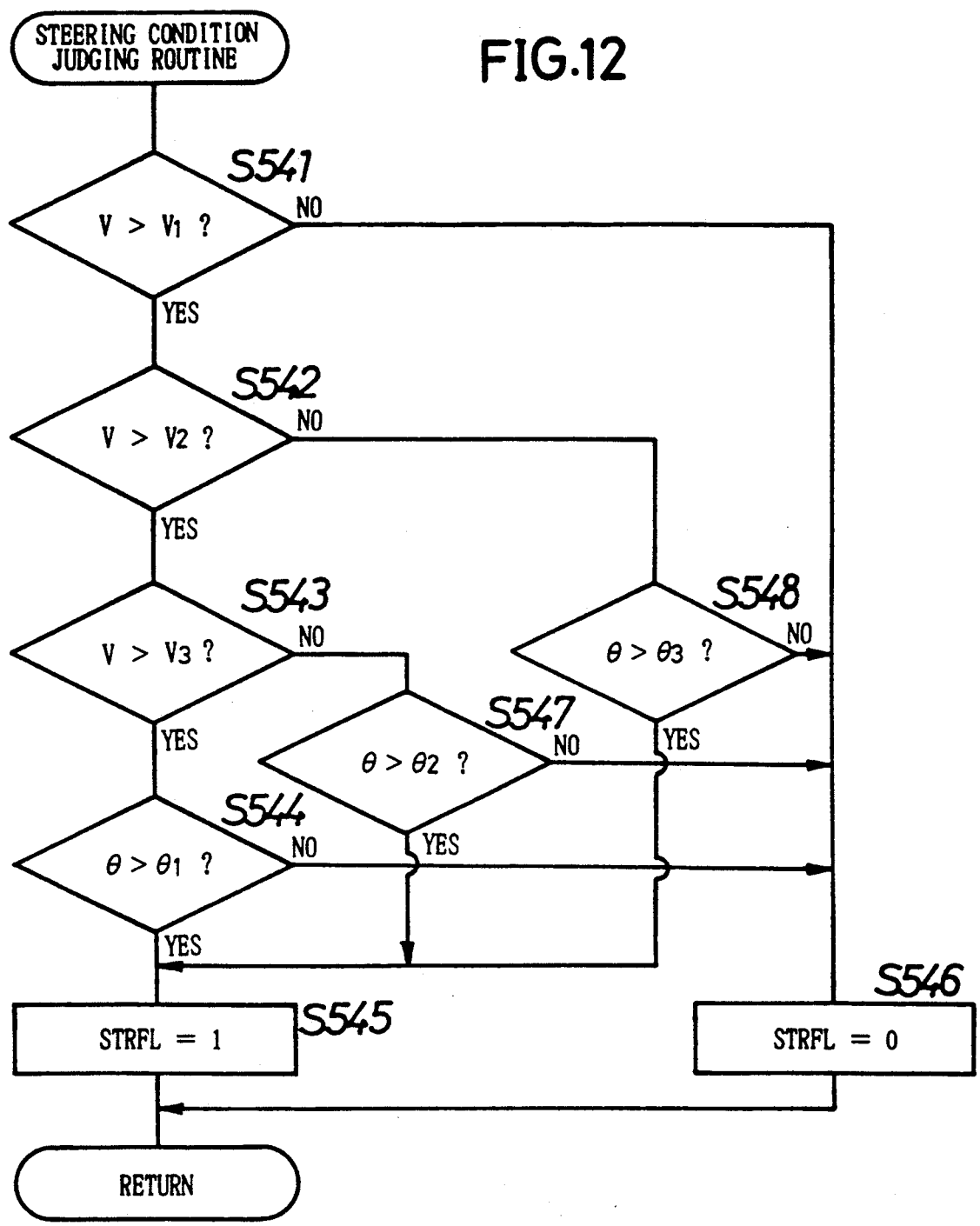
FIG. 12 is a flow chart corresponding to a subroutine of a step S515 shown in FIG. 10.
Figure 13:
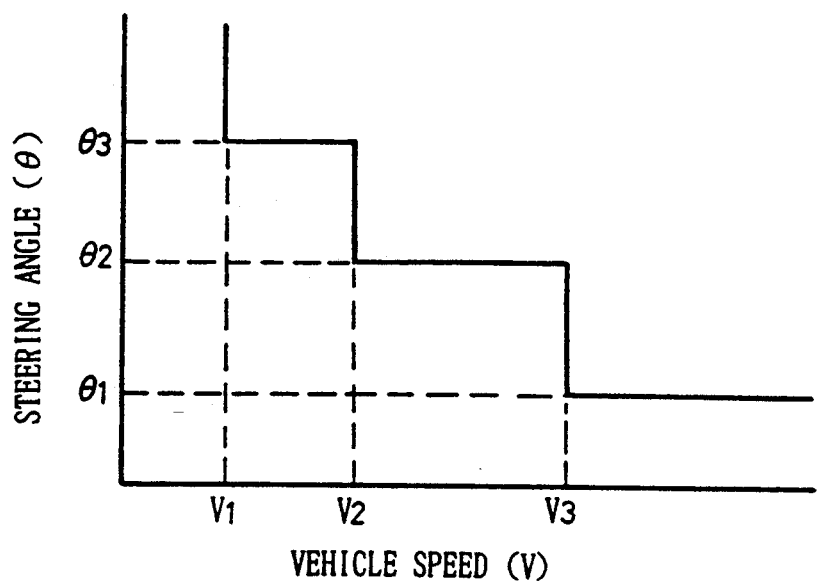
FIG. 13 is a graph attendant on the flow chart shown in FIG. 12.

The detail of the step S515 (judgement of steering conditions) in FIG. 10 will be described below with reference to a flow chart in FIG. 12 and a graph in FIG. 13. If the vehicle speed V calculated from the output signals of the wheel speed sensors 23 is larger than a largest threshold value $V_3$, then the steering flag STRFL is set at "1" when the steering angle $\theta$ detected by the steering sensor 26 is larger than a smallest threshold value $\theta_1$, and the steering flag STRFL is set at "0" when the steering angle $\theta$ is equal to or smaller than the smallest threshold value $\theta_1$ (see steps S541, S542, S543, S544, S545 and S546).

If the vehicle speed V is between the largest threshold value $V_3$ and a threshold value $V_2$ smaller than the largest threshold value $V_3$, then the steering flag STRFL is set at "1" when the steering angle $\theta$ is larger than a mean threshold value $\theta_2$, and the steering flag STRFL is set at "0" when the steering angle $\theta$ is equal to or smaller than the threshold value $\theta_2$ (see the steps S541, S542, S543, S544, S545 and S546).

If the vehicle speed V is between the threshold value $V_2$ and a smallest threshold value $V_1$, then the steering flag STRFL is set at "1" when the steering angle $\theta$ is larger than the largest threshold value $\theta_3$, and the steering flag STRFL is set at "0", when the steering angle $\theta$ is equal to or smaller than the threshold value $\theta_3$ (see the steps S541, S542, S543, S544, S545 and S546).

If the vehicle speed V is equal to or smaller than the smallest threshold value $V_1$, then the steering flag STRFL is set at "0", irrespective of the magnitude of the steering angle $\theta$ (see the steps S541 and S546).

In this way, when the velocity of the vehicle is high, it is decided that the steering is being conducted, even if the steering angle $\theta$ is small. When the velocity of the vehicle is low, it is not decided that the steering is being conducted, unless the steering angle $\theta$ is large.

Figure 14:
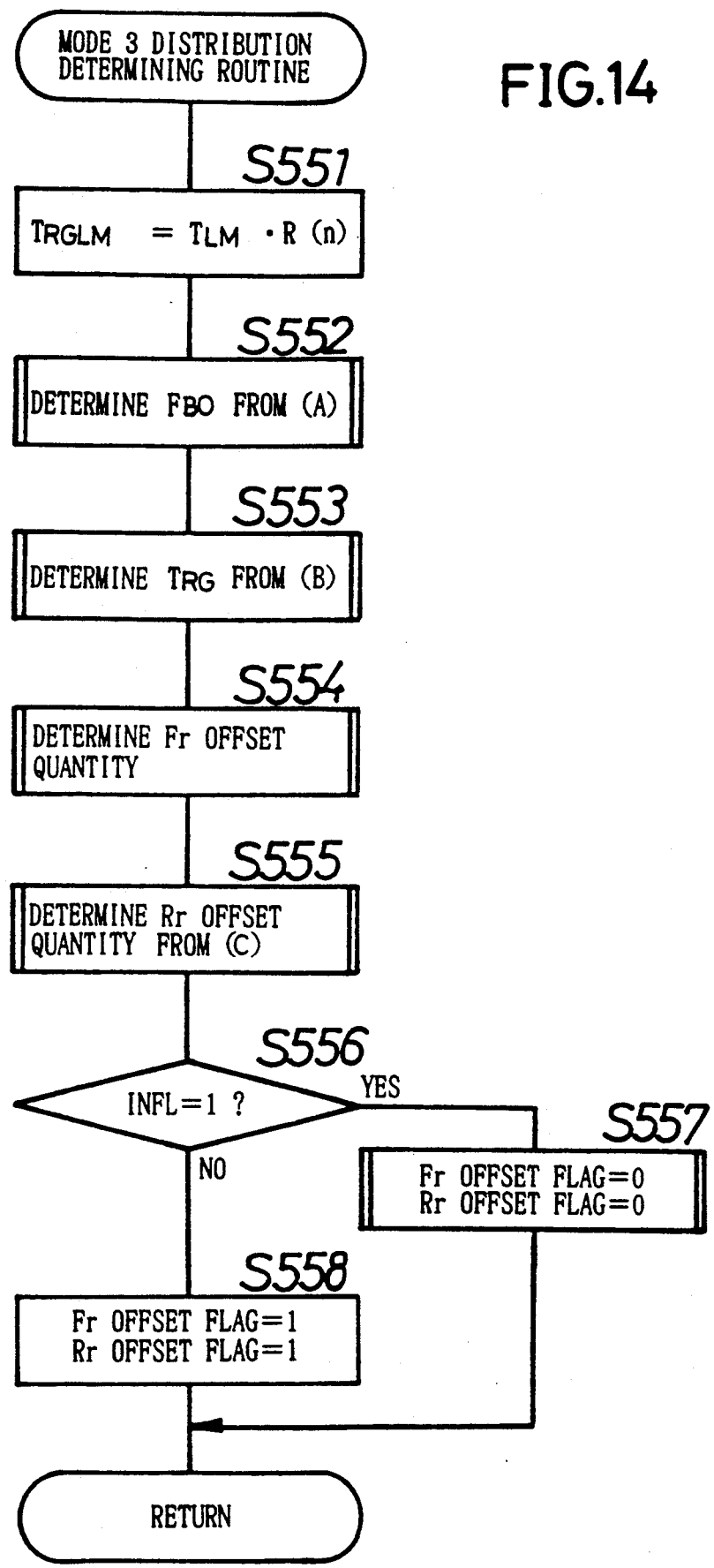
FIG. 14 is a flow chart corresponding to a subroutine of a step S517 shown in FIG. 10.
Figure 17A:
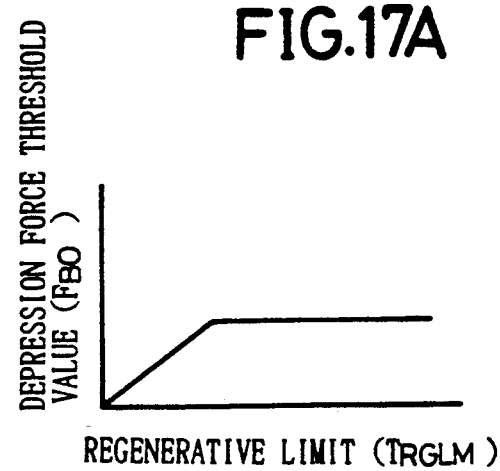
FIGS. 17A, 17B, 17C, and 17D are graphs attendant on the flow charts shown in FIGS. 14 and 15.

The detail of the step S517 (determination of the mode-3 distribution) in FIG. 10 will be described below with reference to a flow chart in FIG. 14 and a graph in FIGS. 17A, 17B, and 17C. At a step S551, a reduced regenerative braking force limit value $T_{RGLM}$ converted into a tire torque is calculated by multiplying the regenerative braking force limit value $T_{LM}$ determined at the step S300 in FIG. 4 by a gear ratio R(n) in an n-th gear shift. At a next step S552, a depression force $F_{BO}$ corresponding to the fold point P (at which the hydraulic braking of the front wheels Wf is started) in the braking force distribution characteristic in FIG. 1 is determined based on a graph in FIG. 17A.

Figure 17B:
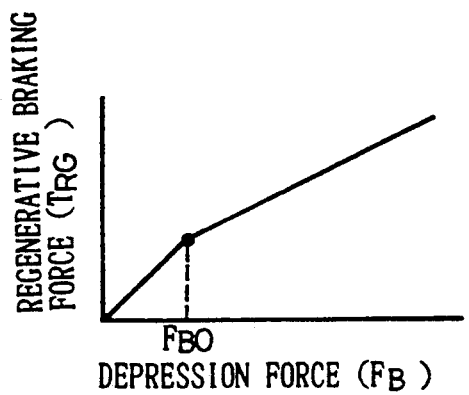
Figure 17C:
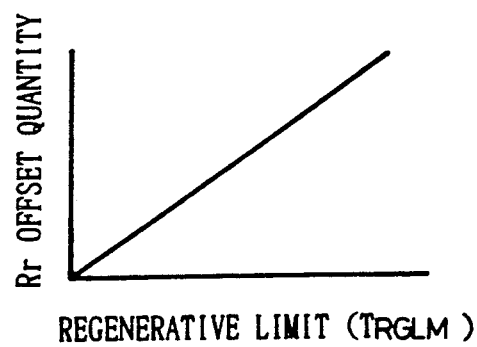

At a step S553, a reduced regenerative braking force $T_{RG}$ corresponding to the depression force $F_B$ is determined based on a graph shown in FIG. 17B. At a next step S554, an Fr offset quantity, i.e., a quantity of operation of the linear solenoid 19f is calculated by multiplying the depression force $F_{BO}$ at the fold point by a constant. At a step S555, an Rr offset quantity, i.e., a quantity of operation of the linear solenoid 19r shown in FIG. 1 is determined based on a graph shown in FIG. 17C. If the initial flag INFL (see the steps S504 and S505) is set at "1" at a subsequent step S556, i.e., if a predetermined time is not lapsed from the start of braking, then both of an Fr offset flag and an Rr offset flag for controlling the ON/OFF valves 15f and 15r shown in FIG. 1 are set at "0" (the valves are opened) at a step S557. On the other hand, if the initial flag INFL is set at "0" at the step S556, i.e., if the predetermined time has been lapsed from the start of braking, then both of the Fr offset flag and the Rr offset flag are set at "1" (the valves are closed) at the step S557.

Figure 15:
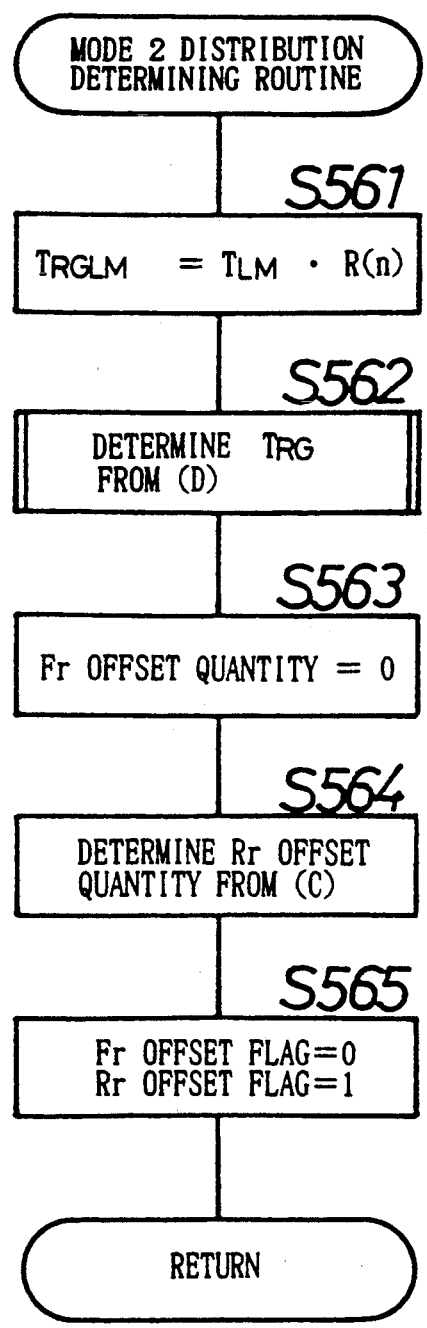
FIG. 15 is a flow chart corresponding to a subroutine of a step S519 shown in FIG. 10.
Figure 17D:
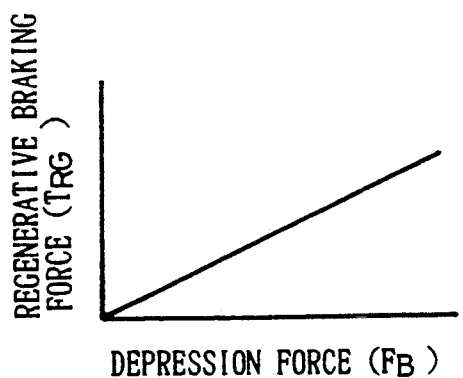

The details of the step S519 (the determination of a mode-2 distribution) shown in FIG. 10 will be described below with reference to a flow chart shown in FIG. 15 and the graph shown in FIG. 17D. At a step S561, a reduced regenerative braking force limit value $T_{RGLM}$ converted into a tire torque is calculated by multiplying the regenerative braking force limit value $T_{LM}$ determined at the step S300 in FIG. 4 by a gear ratio R(n) in an n-th gear shift. At a next step S562, a reduced regenerative braking force $T_{RG}$ is determined based on a graph shown in FIG. 17D.

At a step S563, the Fr offset quantity is set at "0". This is because the braking force distribution characteristic in the mode 2 does not have the fold point P, and the hydraulic braking of the front wheel Wf is conducted from the initial stage of braking. At a next step S564, an Rr offset quantity, i.e., a quantity of operation of the linear solenoid 19r shown in FIG. 1 is searched based on the graph shown in FIG. 17C. At a step S565, the Fr offset flag for controlling the ON/OFF valve 15f for the front wheels is set at "0" (the valve is opened), and the Fr of f set f lag f or controlling the ON/OFF valve 15r for the rear wheels is set at "1" (the valve is closed).

Figure 16:
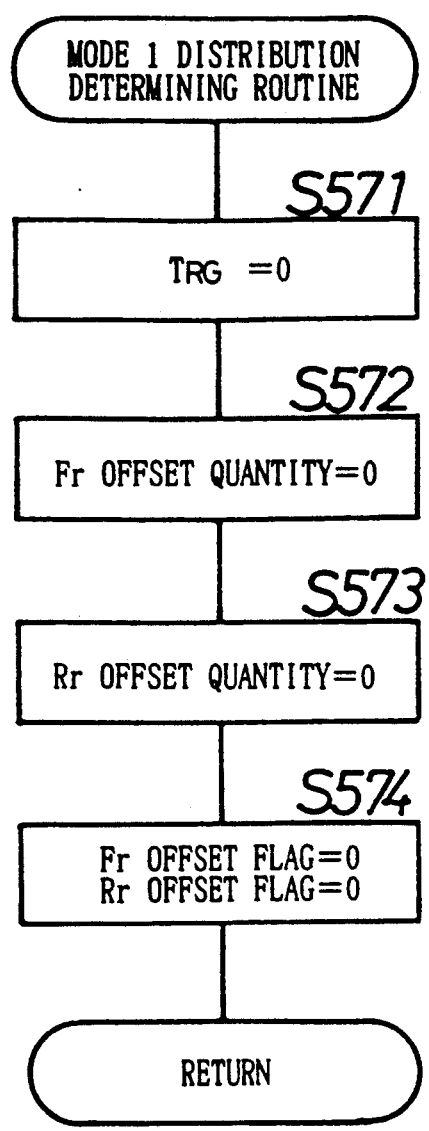
FIG. 16 is a flow chart corresponding to a subroutine of a step S518 shown in FIG. 10.

The details of the step S518 (the determination of a mode-1 distribution) shown in FIG. 10 will be described below with reference to a flow chart shown in FIG. 16. In this mode 1, the regenerative braking is not performed and for this reason, the reduced regenerative braking force $T_{RG}$ is set at "0" at a step S571. At subsequent steps S572 and S573, both of the Fr offset quantity and the Rr offset quantity are set at "0". Finally, at a step S574, both of the Fr offset flag and the Rr offset flag are set at "0" (the valves are opened), and a hydraulic pressure generated by the master cylinder 9 is transmitted in an intact manner to the modulator 12, thereby causing the front and rear wheels Wf and Wr to be braked by a usual hydraulic pressure.

Figure 21:
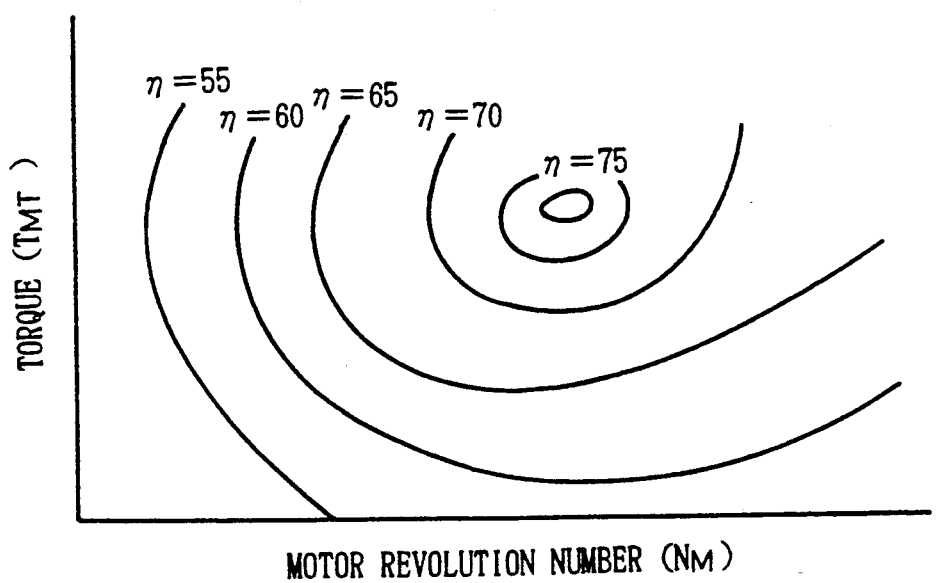
FIG. 21 is a graph attendant on the flow charts shown in FIGS. 18 to 20.
Figure 22:
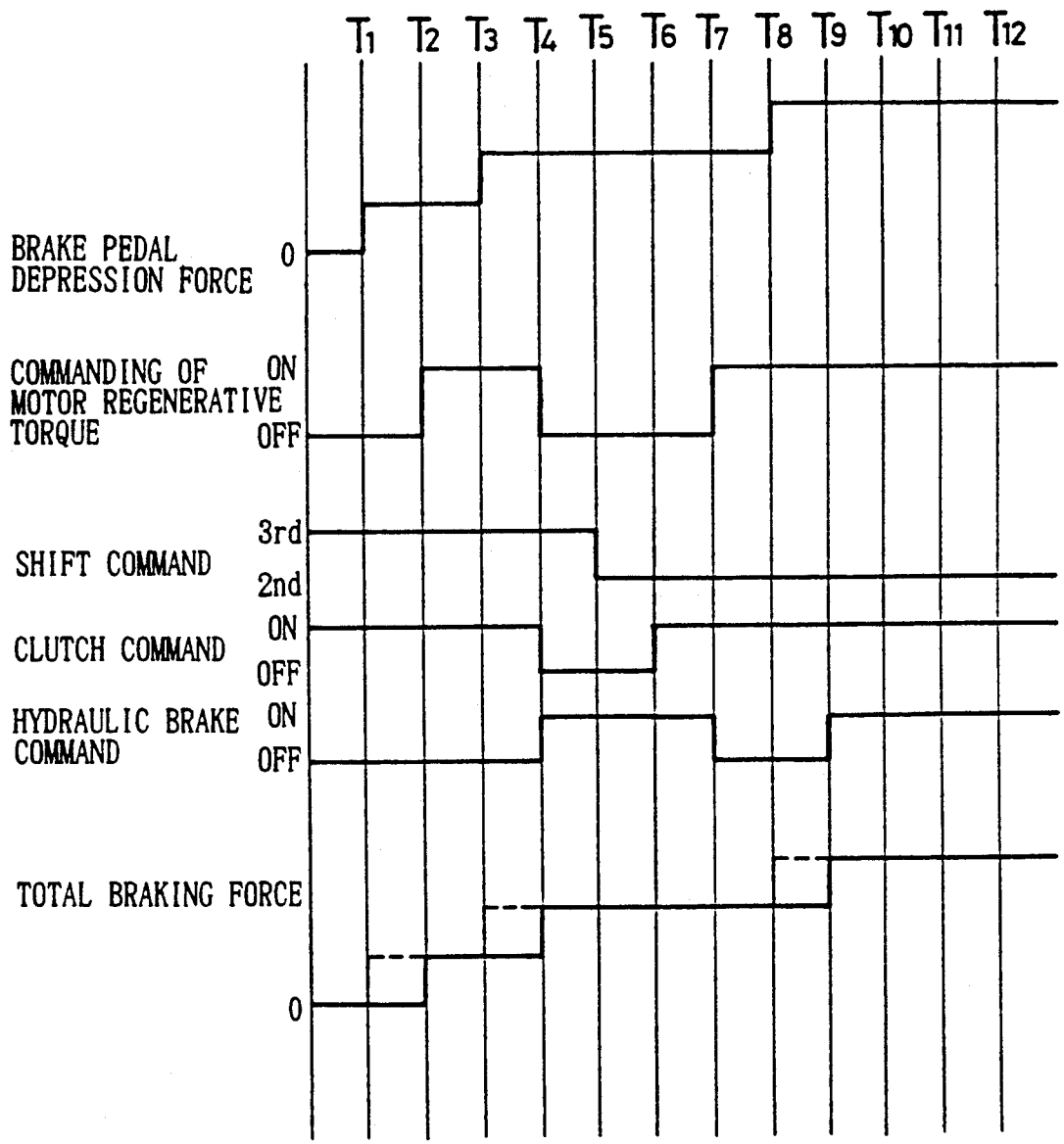
FIG. 22 is a time chart in the event when a shift change is conducted during braking.

The details of a step S600 (the commanding of shifting) shown in FIG. 10 will be described below with reference to flow charts shown in FIGS. 18 to 20, a graph shown in FIG. 21 and a time chart shown in FIG. 22.

Figure 19:
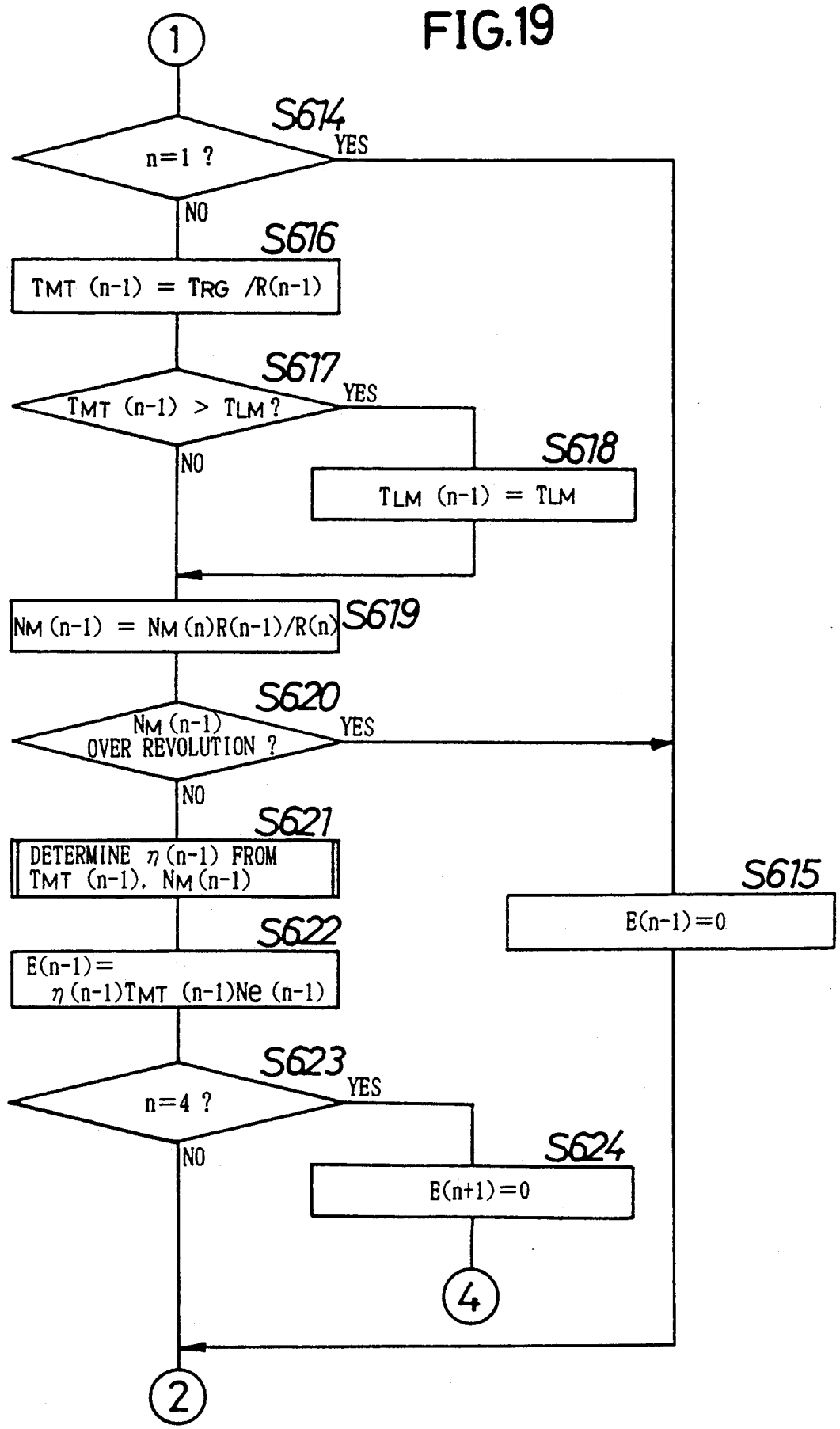
Figure 20:
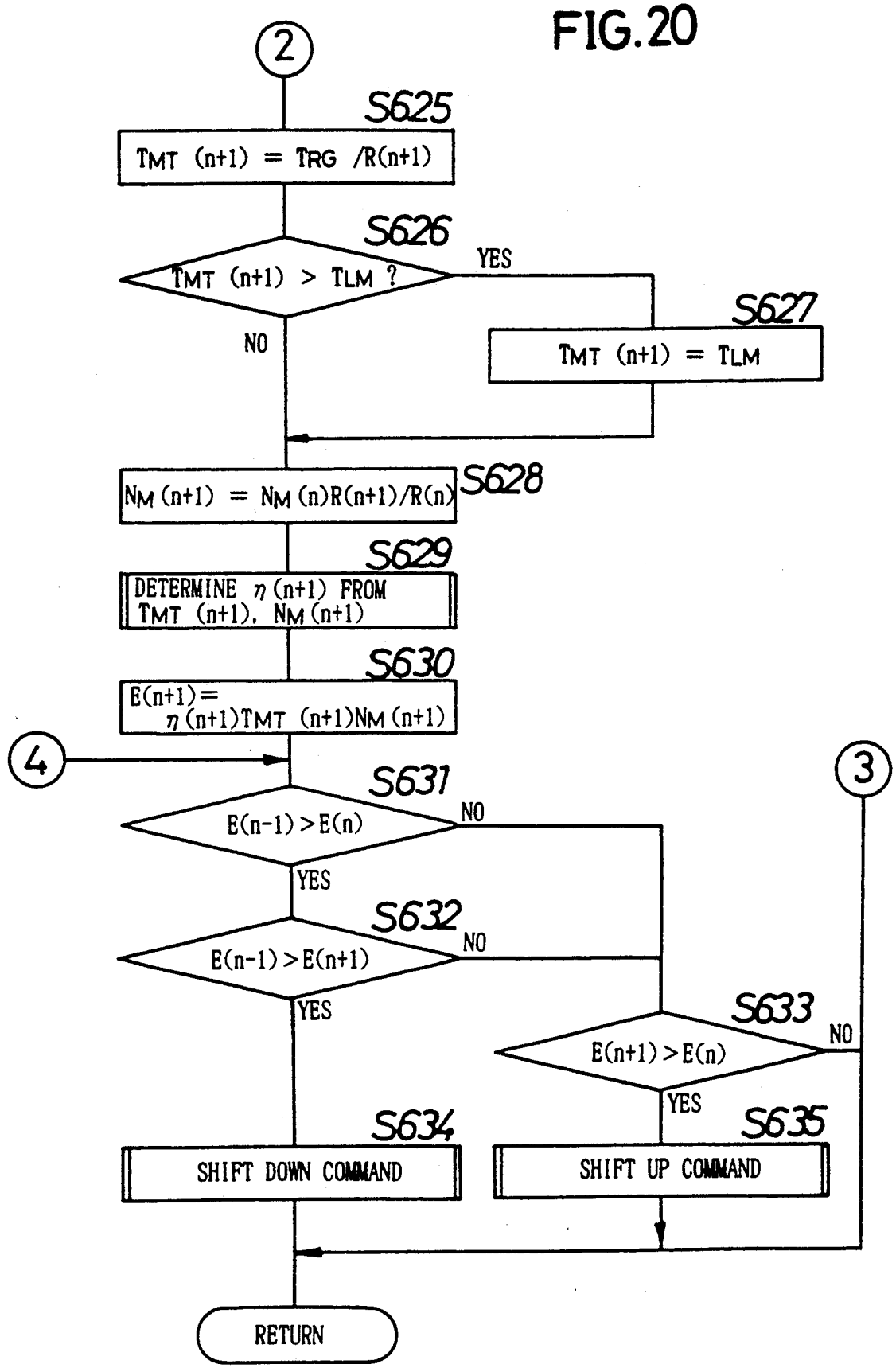

If the shifting is being conducted at a step S601 in the flow charts shown in FIGS. 18 to 20, the shift flag SHFL is set at "1" at a step S602. Then, the reduced regenerative braking force $T_{RG}$ is set at "0" at a step S603, and both of the Fr offset flag and the Rr offset flag are set at "0" (the valves are opened) at a step S604. This causes the front and rear wheels Wf and Wr to be braked by a usual hydraulic pressure without the regenerative braking during the shifting.

If the shift flag SHFL is set at "1" at a step S605, notwithstanding that the shifting is not conducted at the step S601, it is decided that the shifting has been completed. At a subsequent step S606, the hydraulic braking of the front and rear wheels Wf and Wr is released, and at a step S607, the shift flag SHFL is set at "0".

If the steering is being conducted and the steering flag STRFL is set at "1" at a step S608, the commanding of shifting which will be described hereinafter is not performed.

At subsequent steps S609 to 613, an estimated regenerative electric power E(n) in the current shift position n is calculated. More specifically, at the step S609, a motor torque $T_{MT(n)}$ in an n-th gear shift is calculated by dividing the reduced regenerative braking force $T_{RG}$ by a gear ratio R (n). Then, at the step 612, a motor efficiency $\eta$ (n) is determined from the motor torque $T_{MT(n)}$ and the number $N_M$ of revolutions of the motor 2 based on a graph shown in FIG. 21, and at the next step S613, the estimated regenerative electric power in the current shift position n is calculated by multiplying the motor efficiency $\eta$ (n) by the motor torque $T_{MT(n)}$ and the number $N_M$ of revolutions of the motor 2.

Then, an estimated regenerative electric power $E_{(n-1)}$ in the event that a downshifting from the current shift position is performed is calculated at steps S614 to 622. More specifically, if the current shift position n is a first gear shift at the step S614, the downshifting is substantially impossible and hence, the estimated regenerative electric power $E_{(n-1)}$ at the downshifting is set at "0" at the step S615. If the current shift position n is any of second to fourth gear shifts at the step S614, an estimated regenerative electric power $E_{(n-1)}$ in the event when the downshifting to an n−1-st gear shift is conducted is likewise calculated at the steps S616 to S622. In this case, if the motor torque $T_{MT(n-1)}$ exceeds the regenerative braking force limit value $T_{LM}$ at the step S617, the regenerative braking force limit value $T_{LM}$ is equalized to the motor torque $T_{MT(n-1)}$ at the step S618. In the case of the downshifting, the number $N_{M(n-1)}$ of revolutions of the motor 1 at the downshifting performed is calculated from the gear ratios $R_n$ and $R_{(n-1)}$ and the revolution number $N_{m(n)}$ in the n-th gear shift. If the revolution number $N_{M(n-1)}$ is consequently a number corresponding to over-revolutions at the step S620, the estimated regenerative electric power $E_{(n-1)}$ is set at "0" at the step S615.

Subsequently, an estimated regenerative electric power $E_{(n+1)}$ in the event when an upshifting is conducted from the current shift position is calculated at steps S623 to S630. More specifically, if the current shift position n is a fourth gear shift at the step S623, the upshifting is substantially impossible and hence, the estimated regenerative electric power $E_{(n+1)}$ in the event when an upshifting is conducted is set at "0" at the step S624. At the subsequent steps S625 to S630, an estimated regenerative electric power $E_{(n+1)}$ in the event when an upshifting is conducted is likewise calculated. In this case, if the motor torque $T_{MT(n+1)}$ exceeds the regenerative braking force limit value $T_{LM}$ at the step S626, the regenerative braking force limit value $T_{LM}$ is set equal to the motor torque $T_{MT(n+1)}$ at the step S627. It should be noted that in the case of the upshifting, over-revolutions cannot be produced and hence, the judgement of the over-revolutions as carried out in the case of the downshifting is not carried out.

The current estimated regenerative electric power $E_{(n)}$, the estimated regenerative electric power $E_{(n-1)}$ at the downshifting performed and the estimated regenerative electric power $E_{(n+1)}$ at the upshifting performed are compared with one another at steps S631 to 633. If the $E_{(n-1)}$ is largest, a downshifting command is issued at a step S634. Reversely, if the $E_{(n+1)}$ is largest, an upshifting command is outputted at a step S635.

The above-described shifting operation will be described with reference to time chart shown in FIG. 22. Suppose that the operation is conducted, for example, so that the depression force on the brake pedal 8 is gradually increased at times $T_1$, $T_3$ and $T_8$, and a regenerative braking command is outputted at a time $T_2$. In this case, if it is decided that the shift position is downshifted, for example, from the third gear shift to the second gear shift to maximize the regenerated energy, the clutch is disengaged at a time $T_4$.

When the clutch is disengaged, the rear wheels Wr and the motor 2 are disconnected from each other, and the regenerative braking becomes impossible. Therefore, the regenerative braking command to the motor 2 is canceled from the time $T_4$ to a time $T_7$. For a period in which the regenerative braking is not conducted, i.e., for a period from the time $T_4$ to the time $T_7$, a hydraulic braking command is output, so that the regenerative braking is replaced by the hydraulic braking. At a time $T_5$ in a period of disengagement of the clutch from the time $T_4$ to a time $T_6$, a shifting command is output, so that the downshifting from the third gear shift to the second gear shift is carried out.

In the above manner, the total braking force is ensured by the regenerative braking for a period from the time $T_2$ to the time $T_4$, by the hydraulic braking for a period from the time $T_4$ to the time $T_7$, by the regenerative braking for a period from the time $T_7$ to a time $T_9$ and by a combination of the regenerative braking and the hydraulic braking after the time $T_9$.

The details of the step S700 (the control of regenerative and hydraulic braking forces) shown in FIG. 4 will be described with reference to a flow chart shown in FIG. 23.

First, a reduced regenerative braking force $T_{RG}$ is delivered at a step S701. Then, as can be seen from FIG. 1, the rear wheels Wr are regeneratively braked in the mode 3 and the mode 2, so that the reduced regenerative braking force $T_{RG}$ is obtained during initial braking, and electric power generated by the motor 2 as a result of such regenerative braking is supplied for charging. The Fr offset quantity and the Rr offset quantity determined at the steps S554 and S555 shown in FIG. 14 and corresponding to the mode 3, at the steps S563 and S564 shown in FIG. 15 and corresponding to the mode 2 and at the steps S572 and S573 shown in FIG. 16 and corresponding to the mode 1 are delivered at steps S702 and S703. As a result, the linear solenoids 19f and 19r of the hydraulic cylinders for the front and rear wheels Wf and Wr shown in FIG. 1 are operated to adjust the preset loads of the springs 17f and 17r of the differential pressure control valves 16f and 16r to a predetermined magnitude.

If the Fr offset flag is not set at "1" at a subsequent step S704 (in the case of the mode 2 and the mode 1), the ON/OFF valve 15f shown in FIG. 1 is maintained opened at a step S705. Conversely, if the Fr offset flag is set at "1" (in the case of the mode 3), the ON/OFF valve 15f is closed at a step S706.

Figure 3:
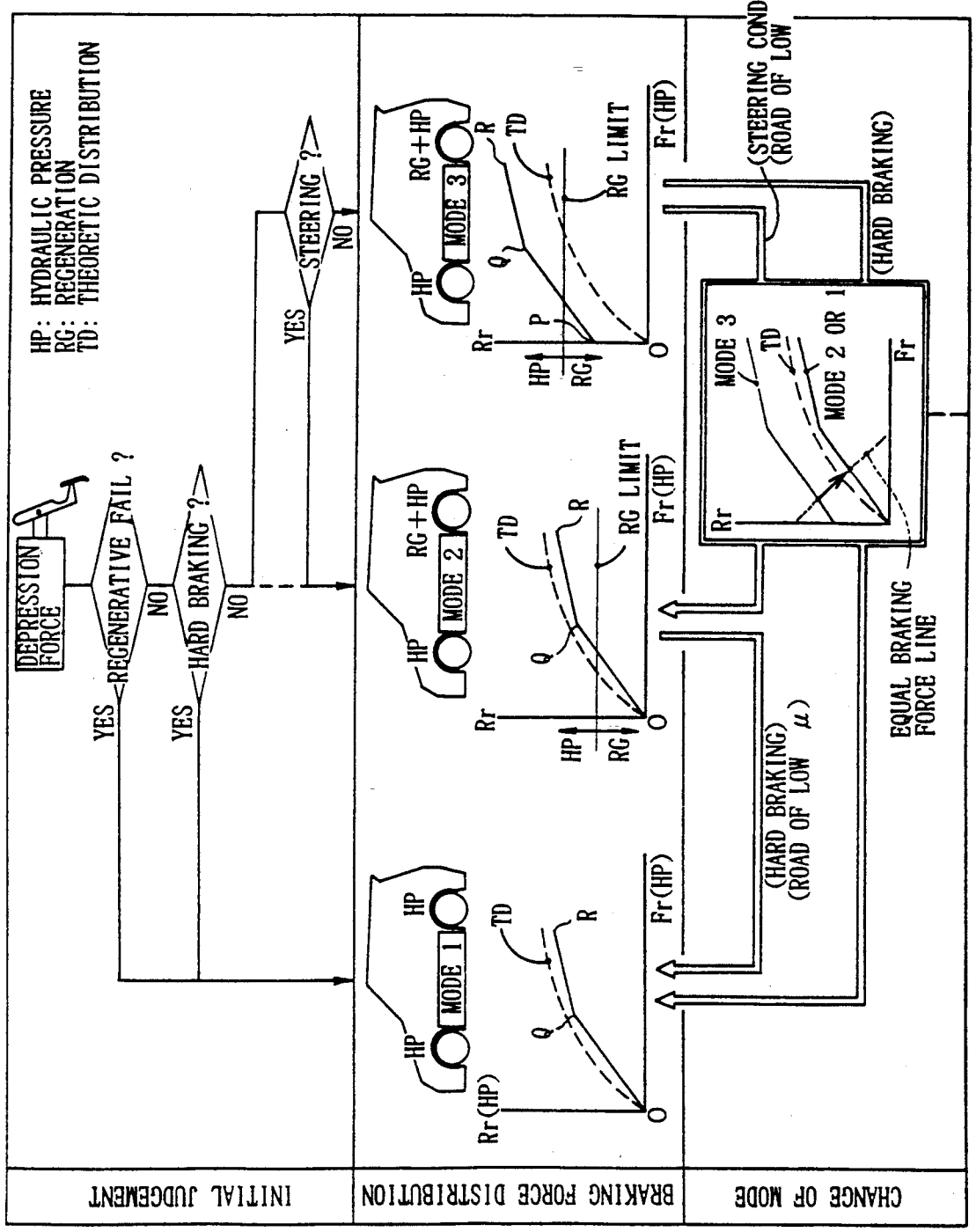
FIG. 3 is a schematic diagram for illustrating braking modes.

Thus, in the modes 2 and 3 in which the ON/OFF valve 15f is maintained opened, a hydraulic braking pressure generated by the master cylinder 9 is transmitted directly to the modulator 12, so that the front wheels Wf are hydraulically braked from the time of an initial braking, as shown in the braking force distribution characteristics in the mode 2 and the mode 1 shown in FIG. 3.

On the other hand, in the mode 3, the ON/OFF valve 15f is closed and hence, the hydraulic braking pressure generated by the master cylinder 9 is blocked by the ON/OFF valve 15f and transmitted via the differential pressure control valve 16f to the modulator 12. In this case, the differential pressure control valve 16f is not opened, until the depression force on the brake pedal 8 is increased to a predetermined value by the preset load of the spring 17f. As a result, the application of the hydraulic braking force to the front wheels Wf at the initial braking is inhibited, as shown by the line OP in the braking force distribution characteristics in the mode 3 shown in FIG. 3. When the hydraulic braking pressure generated by the master cylinder 9 becomes a magnitude corresponding to the fold point P, the differential pressure control valve 16f is opened, so that the hydraulic braking force is started to be applied to the front wheels Wf.

Figure 23:
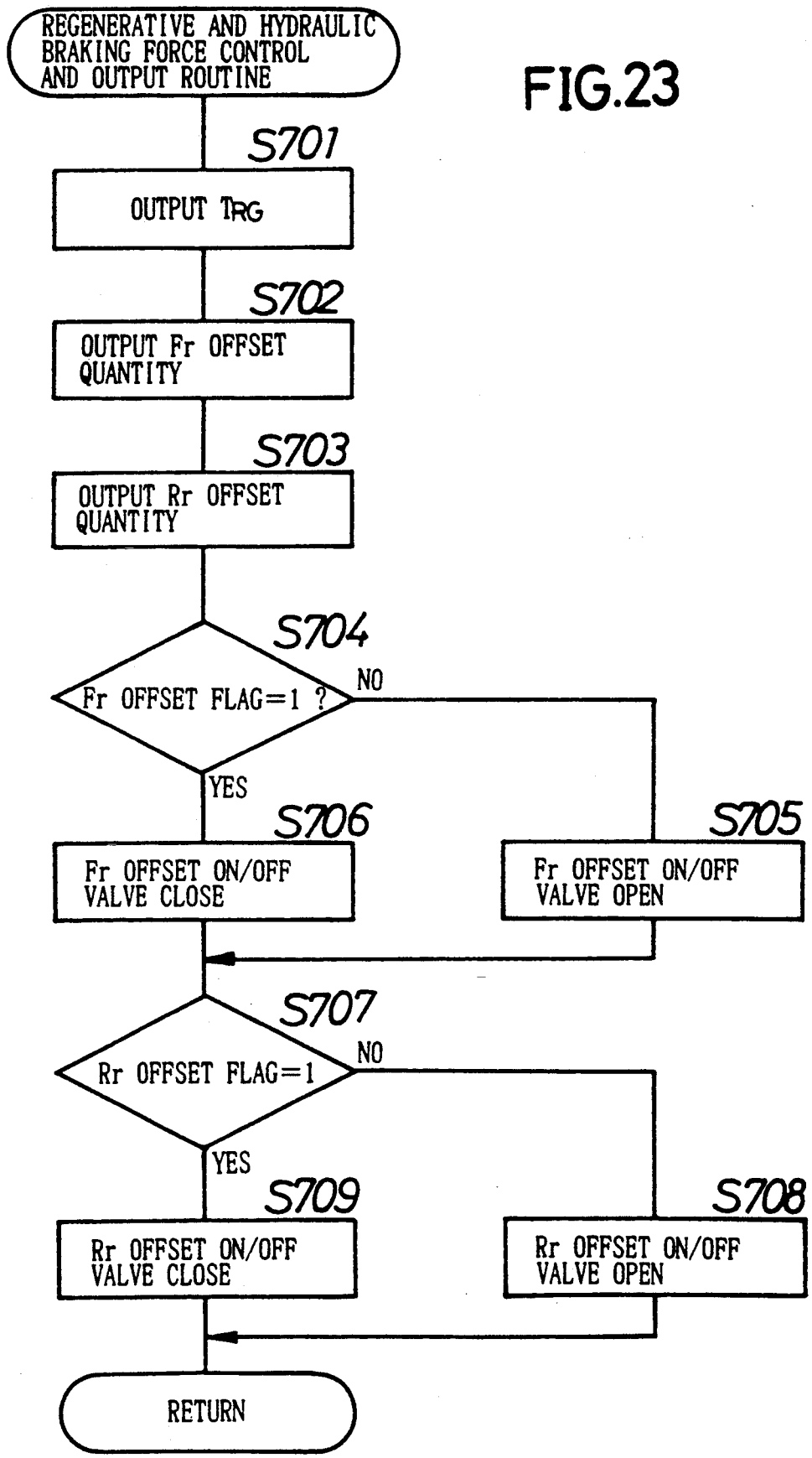
FIG. 23 is a flow chart corresponding to a subroutine of a step S700 in the main routine.

Returning to the flow chart shown in FIG. 23, if the Rr offset flag is not set at "1" at a step S707 (in the case of the mode 1), the ON/OFF valve 15r is maintained opened at a step S708. Reversely, if the Rr offset flag is set at "1" (in the case of the mode 3 and the mode 2), the ON/OFF valve 15r is closed at a step S709.

Thus, in the mode 1 in which the ON/OFF valve 15r is maintained opened, the hydraulic braking pressure generated by the master cylinder 9 is transmitted directly to the modulator 12, so that the rear wheels Wr are hydraulically braked from the time of the initial braking, as shown in the braking force distribution characteristic in the mode 1 shown in FIG. 3.

On the other hand, in the mode 3 and the mode 2, the ON/OFF valve 15r is closed and hence, the hydraulic braking pressure generated by the master cylinder 9 is blocked by the ON/OFF valve 15r and transmitted via the differential pressure control valve 16r to the modulator 12. In this case, the differential pressure control valve 16r is not opened, until the depression force on the brake pedal 8 is increased to a predetermined value by the preset load of the spring 17r. As a result, the application of the hydraulic braking force to the rear wheels Wr to regeneration limits in the braking force distribution characteristics in the mode 3 and 2 shown in FIG. 3 is inhibited. When the hydraulic braking pressure generated by the master cylinder 9 becomes a magnitude corresponding to such regeneration limit, the differential pressure control valve 16r is opened, so that the hydraulic braking force is started to be applied to the rear wheels Wr and thereafter, the regenerative braking force and the hydraulic braking force are applied to the rear wheels Wr.

Now, at the start of braking, the mode 3 is first selected for usual braking, as described in the flow charts shown in FIGS. 9 and 10. In this case, if a failure of the regenerative braking system, hard braking, or a special condition such as steering, is detected, the mode is shifted from mode 3 to mode 1 or mode 2. However, if only the regenerative braking of the rear wheels Wr is conducted immediately after the start of braking in the mode 3, there is a possibility of a delayed response due to a rise-time of the hydraulic pressure. In order to prevent this, the initial flag INFL is set at "1" for an extremely short period of time until the initial timer INT adapted to start the countdown simultaneously with the start of braking reaches the time-up, as given in the steps S502 to S505 shown in FIG. 9. As a result, both of the Fr offset flag and the Rr offset flag are set at "0", as given in the steps S558 and S557. Therefore, in addition to the regenerative braking of the rear wheels Wr in the usual mode 3, the hydraulic braking of the front wheels Wf and the hydraulic braking of the rear wheels Wr by opening of the ON/OFF valves 15f and 15r are simultaneously carried out for a predetermined period of time immediately after the start of braking.

When the mode is shifted from the mode 3 immediately after the start of braking to the mode 1 or the mode 2, the hydraulic braking can be started without any delay to avoid the delay of response of the braking. It is of course that when the mode 3 is selected again, the temporary hydraulic braking is discontinued after the time-up of the initial timer INT and turned to the regenerative braking of the rear wheels Wr in the mode 3.

When the brake pedal 8 is depressed from an accelerating condition to effect a braking, a slight delay of response is produced until the regenerative braking begins to become actually effective, due to a backlash or a distortion present in a power transmitting system for transmitting a driving force from the motor 2 through the transmission 3, the differential 4 and a drive shaft to the rear wheels Wr. However, the delay of response of the regenerative braking can be minimized by producing the hydraulic braking simultaneously with the depression of the brake pedal 8, as described above.

Figure 26:
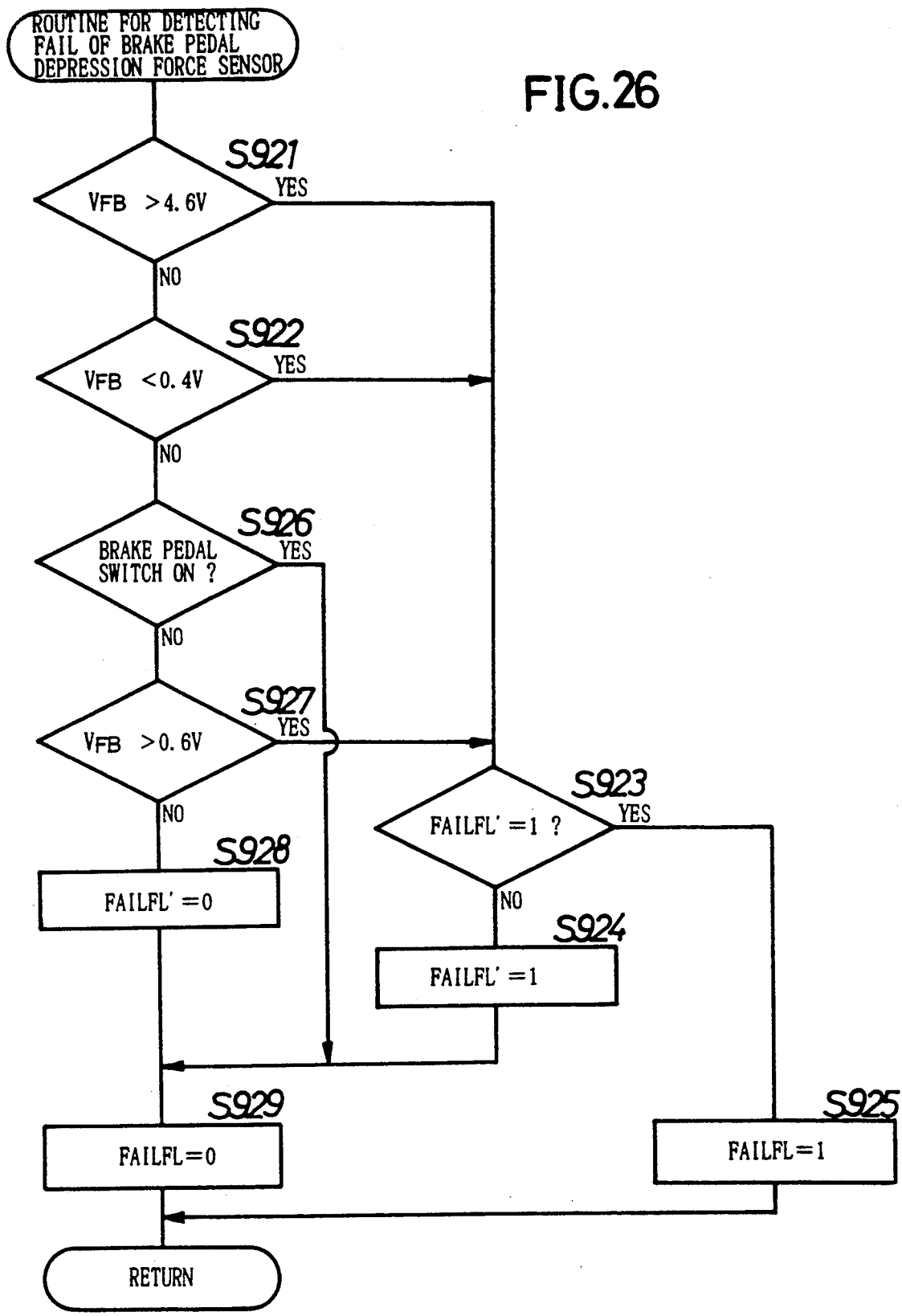
FIG. 26 is a flow chart corresponding to a subroutine of a step S903 shown in FIG. 24.
Figure 27:
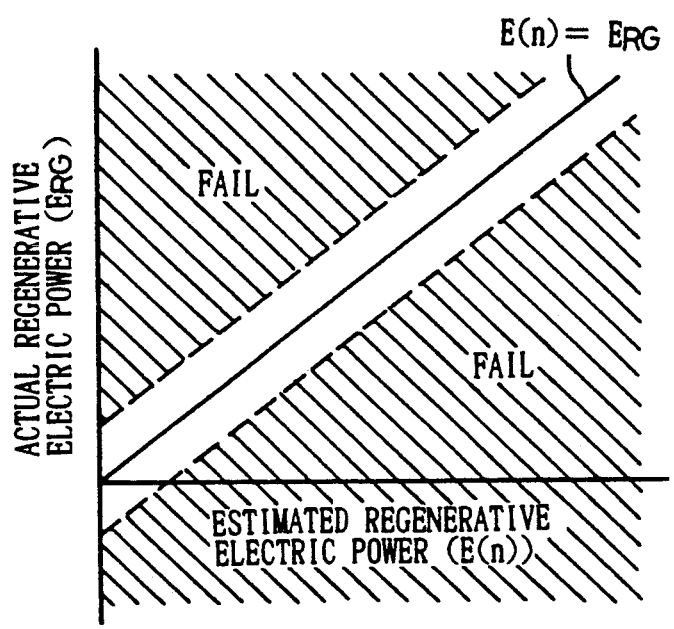
FIG. 27 is a graph attendant on the flow chart shown in FIG. 25.
Figure 28:
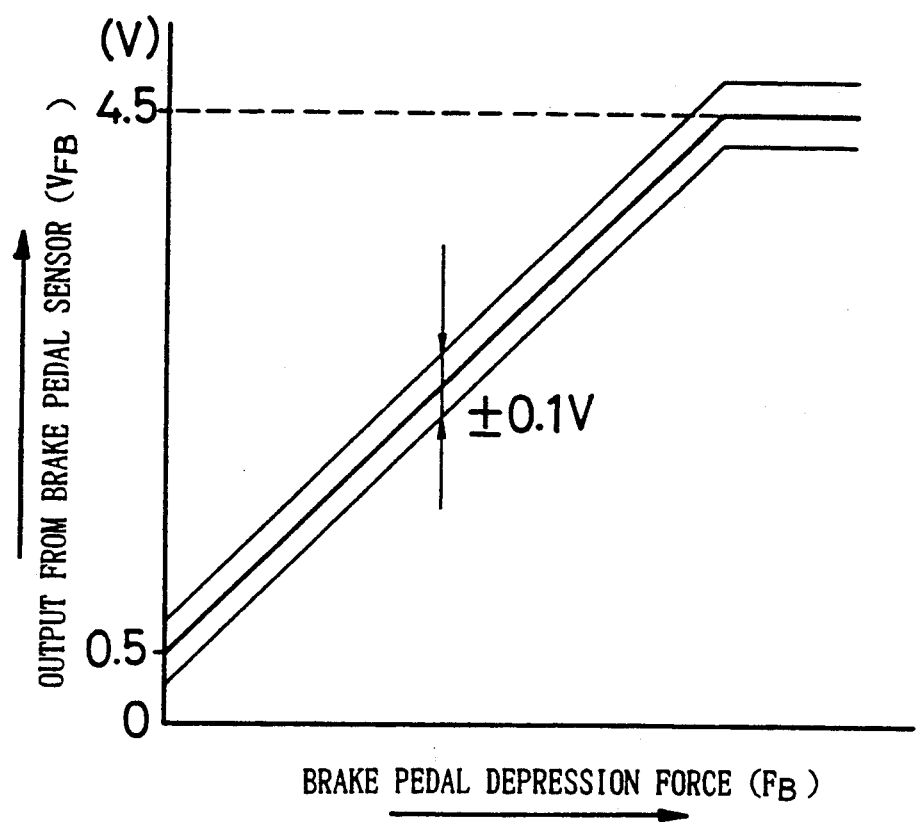
FIG. 28 is a graph attendant on the flow chart shown in FIG. 26.

The details of a step S900 (judgement of fails) shown in FIG. 4 will be described below with reference to flow charts shown in FIGS. 24 to 26 and graphs shown in FIGS. 27 and 28.

Figure 24:
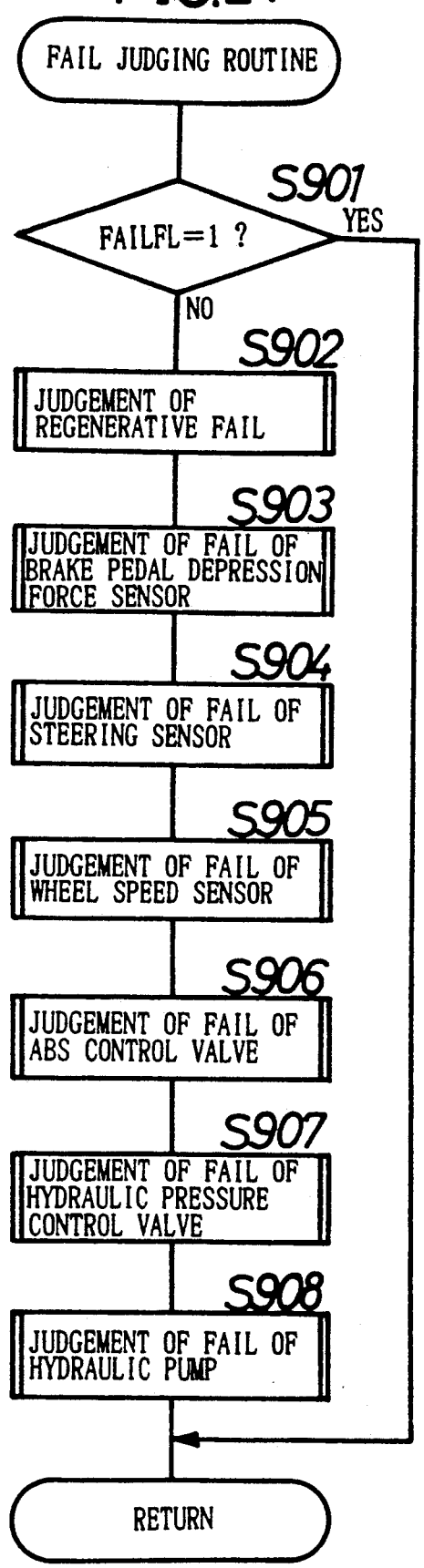
FIG. 24 is a flow chart corresponding to a subroutine of a step S900 in the main routine.

If any trouble is not produced and the fail flag FAILFL (see the step S508 shown in FIG. 9) is not set at "1" at a step S901 in the flow chart shown in FIG. 24, the failure of the regenerative braking system, the brake pedal depression force sensor $24_1$, the steering sensor 26, the wheel speed sensors 23, the ABS control valves 14f and 14r, the hydraulic pressure control valves, i.e., the ON/OFF valves 15f and 15r and the differential pressure control valves 16f and 16r, and the hydraulic pump 10 are detected sequentially at subsequent steps S902 to 908.

A subroutine of the step S902 (judgement of regenerative fails) shown in FIG. 24 will be described below with reference to a flow chart shown in FIG. 25.

First, at a step S911, an actual regenerative electric power $E_{RG}$ generated by the motor 2 is calculated by multiplying an output signal $V_B$ from the battery voltage sensor $20_1$ and an output signal $I_B$ from the battery current sensor $20_2$ by each other. At subsequent steps S912 and S913, it is determined whether or not the actual regenerative electric power $E_{RG}$ is between two values resulting from the addition and subtraction of a predetermined value $\alpha$ to and from the estimated regenerative electric power $E_{(n)}$ calculated at the step S613 shown in FIG. 18, i.e., between $E_{(n)}+\alpha$ and $E_{(n)}-\alpha$. If the actual regenerative electric power $E_{RG}$ and the estimated regenerative electric power $E_{(n)}$ are in the obliquely lined regions shown in FIG. 27, it is decided that there is an abnormality in the regenerative braking system.

If the judgement of abnormality has been first conducted and a temporary fail flag FAILFL' is not set at "1" at a step S914, the temporary fail flag FAILFL' is set at "1" at a step S915. When it is decided again in a next loop that there is an abnormality in the regenerative braking system, i.e., when the temporary fail flag FAILFL' has been set at "1" at the step S914, the fail flag FAILFL is finally set at "1" at a step S916. When it is decided at the steps S912 and S913 that the regenerative braking system is normal, the temporary fail flag FAILFL' and the fail flag FAILFL are set at "0" at steps S917 and S918. If the temporary fail flag FAILFL' is set at "1" at the step S915, the fail flag FAILFL is set at "0" at the step S918.

If the actual regenerative electric power $E_{RG}$ is excessively large, so as to exceed a predetermined value, or excessively small by comparison of the actual regenerative electric power $E_{RG}$ with the estimated regenerative electric power $E_{(n)}$ and it is decided that there is an abnormality, the temporary fail flag FAILFL' is set. If the abnormality is also continuously detected in a next loop, the fail flag FAILFL is set, thereby enabling the failure of the regenerative braking system to be reliably detected without any influence such as electrical waves which may invade from the outside of the control system, such as from the outside of the vehicle.

A subroutine 21 of the step S903 (the judgement of a fail of the brake pedal depression force sensor) shown in FIG. 24 will be described below with reference to the flow chart shown in FIG. 26.

First, at steps S921 and S922, it is judged whether of not the output signal from the brake pedal depression force sensor $24_1$ is between 0.4 V to 4.6 V. As shown in the graph shown in FIG. 28, the output $V_{FB}$ from the brake pedal depression force sensor $24_1$ is set so that it is increased linearly from 0.5 V to 4.5 V, as the depression force $F_B$ is increased, and thereafter, such output is maintained constant at 4.5 V. An acceptable range of error of the brake pedal depression force sensor $24_1$ is from $-0.1$ V to 0.1 V and hence, if the brake pedal depression force sensor $24_1$ is normal, the output $V_{FB}$ should be between the minimum value of 0.4 V and the maximum value of 4.6 V. Therefore, if the output $V_{FB}$ is not between 0.4 V and 4.6 V at the steps S921 and S922, it is decided that there is an abnormality in the brake pedal depression force sensor $24_1$.

If the judgement of abnormality has been first performed and the temporary fail flag FAILFL' is not set at "1" at a step S923, the temporary fail flag FAILFL' is set at "1" at a step S924. If it is decided again in a next loop that there is an abnormality in the brake pedal depression force sensor $24_1$, i.e., if the temporary fail flag FAILFL' is set at "1" at the step S924, then the fail flag FAILFL is finally set at "1" at a step S925.

If the output $V_{FB}$ from the brake pedal depression force sensor 24, exceeds 0.6 V at a step S927, notwithstanding that the brake pedal switch $24_2$ is not turned ON at a step S926, i.e., notwithstanding that the brake pedal 8 is not operated, it is decided that there is an abnormality in the brake pedal depression force sensor $24_1$, passing into the step S923.

If it is decided at the steps S921, S922, S926 and S927 that the brake pedal depression force sensor $24_1$ is normal, both of the temporary fail flag FAILFL' and the fail flag FAILFL are set at "0" at steps S928 and S929. If the brake pedal switch $24_2$ is turned ON at the step S926 and if the temporary fail flag FAILFL' is set at "1" at the step S924, the fail flag FAILFL is set at "0" at the step S929.

As described above, it is decided that there is an abnormality, if the output $V_{FB}$ from the brake pedal depression force sensor $24_1$ indicates an impossible value (equal to or less than 0.4 V and equal to or not more than 4.6 V) when the brake pedal 8 is operated, and if the output $V_{FB}$ from the brake pedal depression force sensor $24_1$ indicates an impossible value (equal to or more than 0.6 V). Therefore, it is possible to reliably detect not only an abnormality of the output from the brake pedal depression force sensor $24_1$ but also a failure due to a sticking of the brake pedal depression force sensor $24_1$. Moreover, it is finally decided that there is an abnormality, when the abnormality is continuously detected by use of the temporary fail flag FAILFL'. Therefore, it is possible to reliably detect the failure of the brake pedal depression force sensor $24_1$ without any influence such as electrical waves which may invade from the outside of the control system, such as from the outside of the vehicle.

Figure 29:
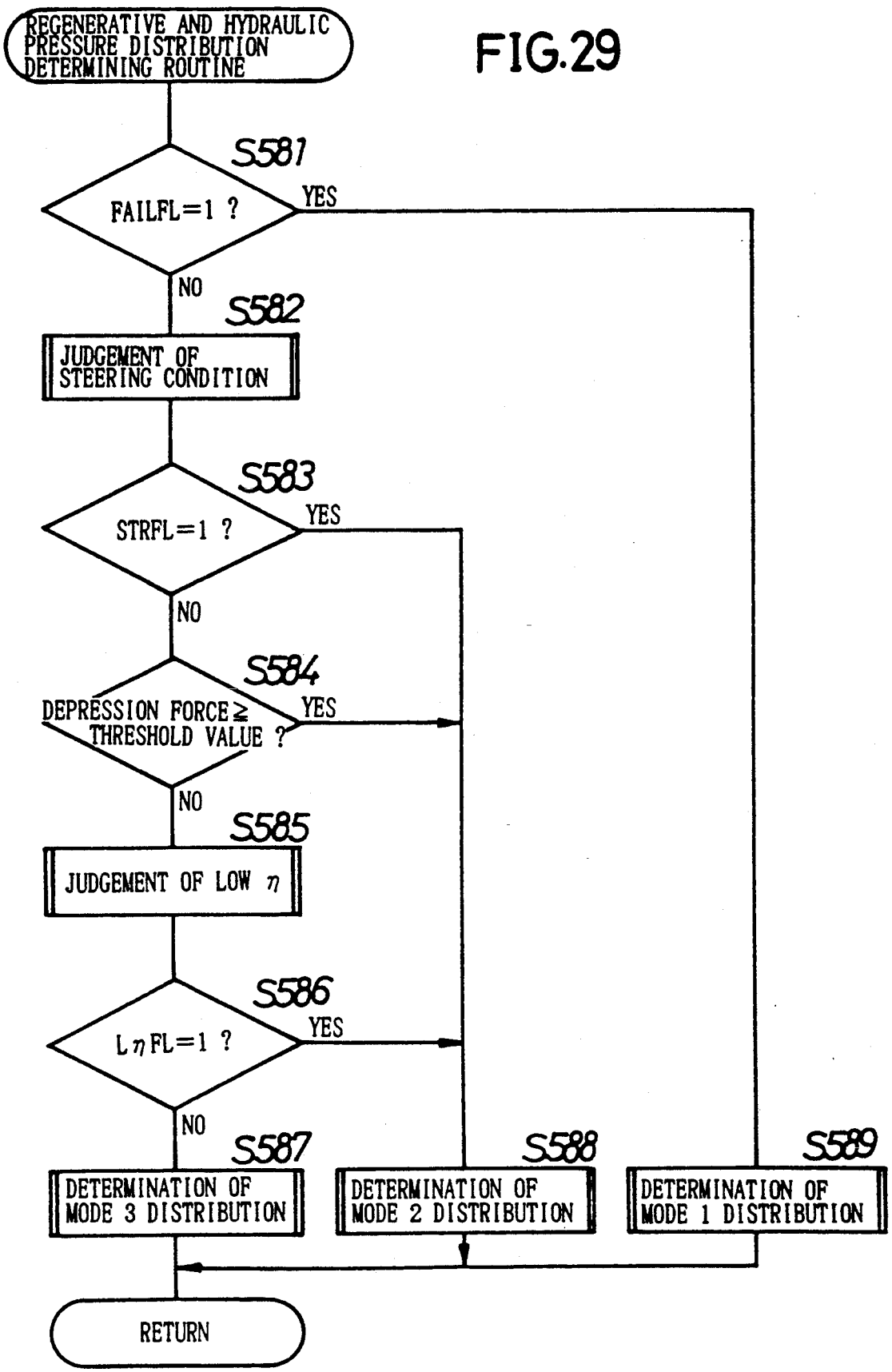
FIG. 29 is a flow chart of another embodiment corresponding to FIGS. 9 and 10.

FIG. 29 illustrates another embodiment, in which the regenerative and hydraulic pressure distribution determining routine shown in FIGS. 9 and 10 is simplified.

In this embodiment, if the regenerative braking system is not out of order, if the steering is not conducted, if the depression force is not equal to or more than a threshold value and if the friction coefficient of a road surface is not low, the usual mode 3 is selected (see the steps S581, S582, S583, S584, S585, S586 and S587).

If the regenerative braking system is out of order at the step S581, the mode 1 is selected unconditionally at the step S589. If it is decided at the steps S582 and S583 that the steering is being conducted, if it is decided at the step S584 that the depression force has become equal to or more than the threshold value and a hard braking is applied, or if it is decided at the steps S585 and S586 that the friction coefficient of a road surface is low, so that there is a possibility of the locking of the wheel, the mode 2 is selected at the step S588.

Figure 30:
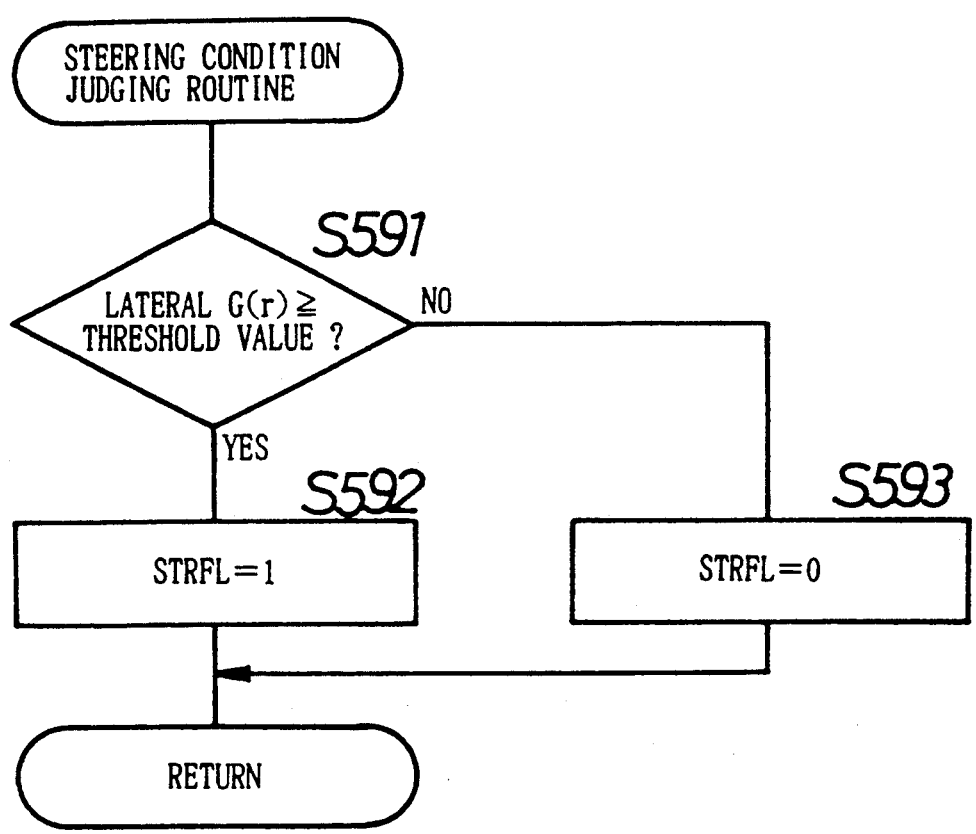
FIG. 30 is a flow chart corresponding to a subroutine of a step S582 shown in FIG. 29.

FIG. 30 illustrates a subroutine of the step S582 (the judgement of a steering condition) shown in FIG. 29. In this subroutine, if the lateral acceleration of the vehicle is equal to or higher than a reference value at a step S591, it is decided that the steering is being conducted, and the steering flag STRFL is set at "1" at a step S592. If the lateral acceleration is lower than the reference value, it is decided that the steering is not conducted, and the steering flag STRFL is set at "0" at a step S593. Alternatively, the steering condition can be judged using a yaw rate as a parameter in place of the lateral acceleration of the vehicle at the step S591.

Figure 25:
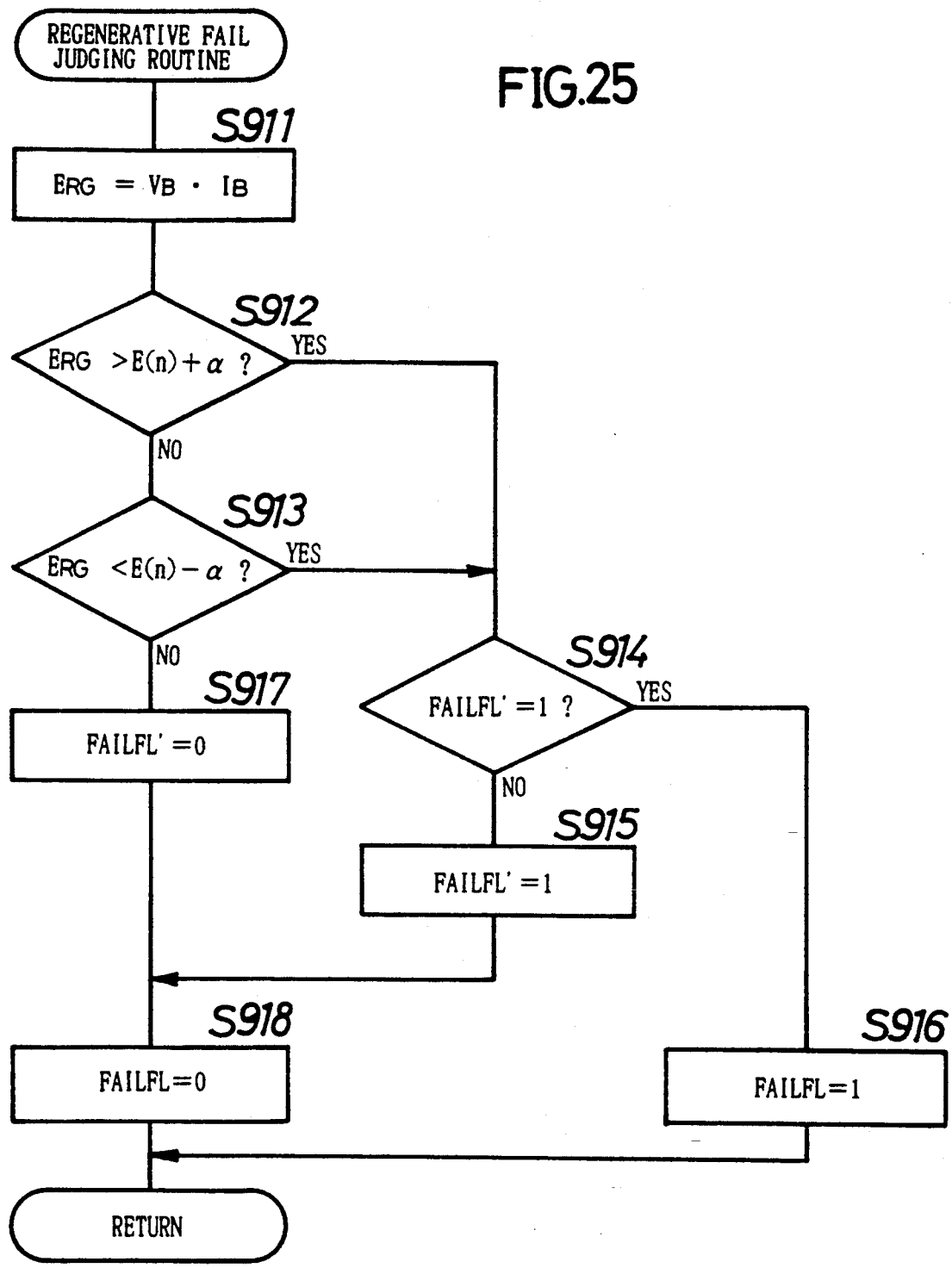
FIG. 25 is a flow chart corresponding to a subroutine of a step S902 shown in FIG. 24.
Figure 31:
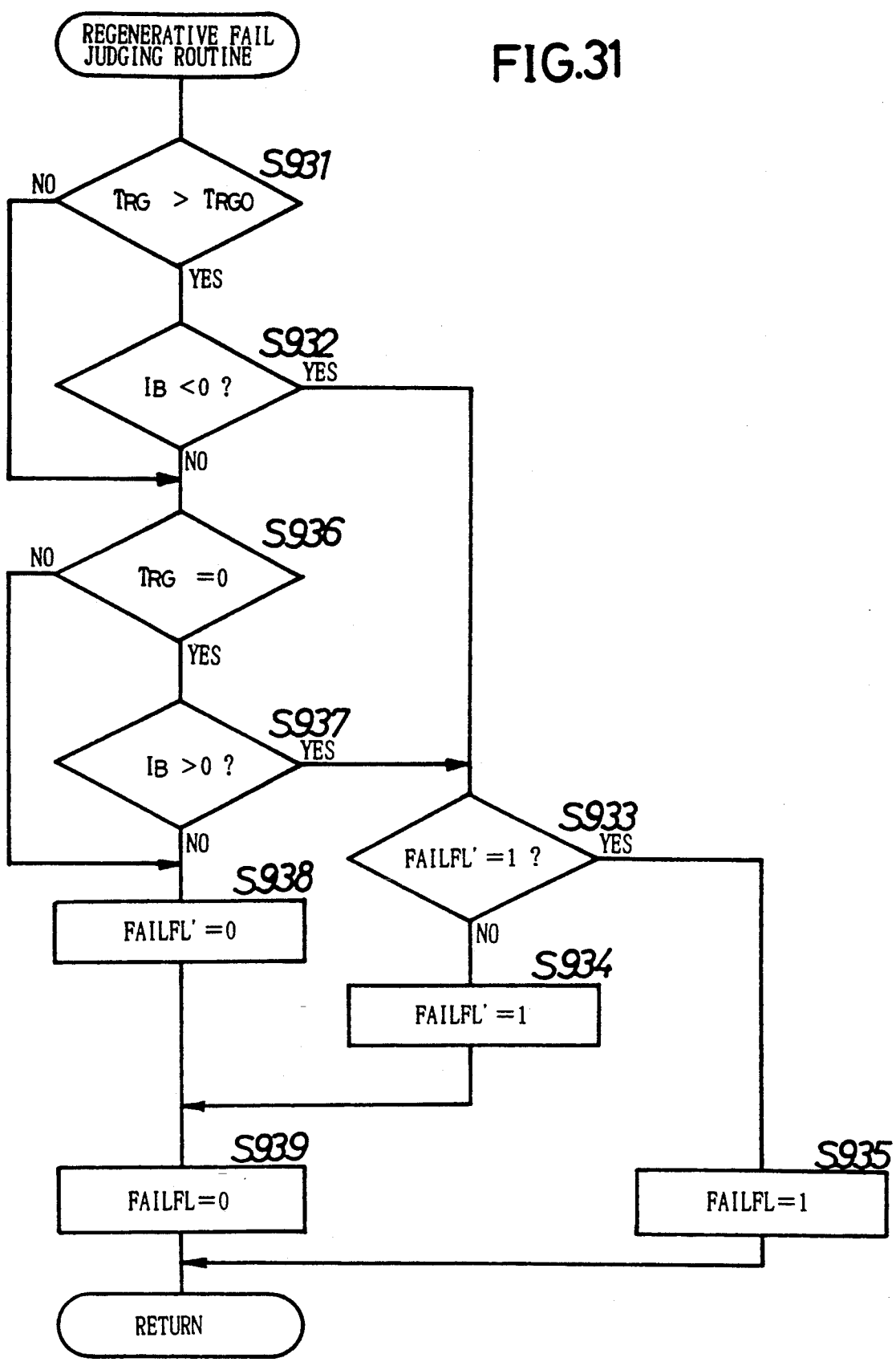
FIG. 31 is a flow chart of a further embodiment corresponding to FIG. 25.

FIG. 31 illustrates an alternate embodiment of the regenerative fail judging routine shown in FIG. 25.

First, at a step S931, the reduced regenerative braking force $T_{RG}$ (see the step S556 shown in FIG. 14 and the step S562 shown in FIG. 15) converted into a tire torque is compared with a reference reduced regenerative braking force $T_{RG0}$ corresponding to the maximum electric power consumed by loads of electric equipments. If the reduced regenerative braking force $T_{RG}$ exceeds the reference reduced regenerative braking force $T_{RG0}$ thereby enabling the loads to be compensated for by the regenerated electric power, it is judged at a step S932 whether an electric current value $I_B$ delivered by the battery current sensor $20_2$ is plus or minus. If the electric current value $I_B$ is minus and the battery 1 is being charged, it is decided that there is an abnormality, and the temporary fail flag FAILFL' and the fail flag FAILFL are operated at steps S933, S934 and S935 in the same manner as described above.

If normal at the step S931 and S932 (if YES at the step S931 and No at the step S932), the processing is advanced to a step S936. If the electric current value $I_B$ is plus at the step S937 and the battery is being charged, notwithstanding that the reduced regenerative braking force $T_{RG}$ is 0 (zero) and the regenerative braking is not conducted, it is also decided that there is an abnormality, passing to the step S933. It should be noted that the temporary fail flag FAILFL' and the fail flag FAILFL are reset at steps S938 and S939 in the same manner as at the steps S917 and S918 shown in FIG. 25.

Although the embodiments of the present invention have been described above, it will be understood that the present invention is not limited to these embodiment, and various minor modifications in design can be made without departing from the spirit and scope of the invention.

For example, although the vehicle having the front wheels Wf as follower wheels and the rear wheels Wr as driving wheels is shown and described by way of example, the present invention is applicable to a vehicle having front wheels as driving wheels and rear wheels as follower wheels. In addition, although the vehicle in the embodiments includes the gear type transmission as a transmitting device, the present invention is applicable to a vehicle including a continuously variable transmission such as CVT in place of the above-described transmission.

What is claimed is:

1. A transmission control system in an electric vehicle in which a battery is used as an energy source for a motor and is charged with an electric power generated by said motor through regenerative braking of a driving wheel which is connected to said motor through a transmission, said transmission control system comprising transmission ratio determination means for calculating a regenerative energy capable of being generated at a current transmission ratio, a regenerative energy capable of being generated when said transmission ratio is increased, and a regenerative energy capable of being generated when said transmission ratio is decreased, and comparing results of these calculations to determine a transmission ratio at which a largest regenerative energy can be obtained, and transmission control means for changing said transmission ratio of said transmission into a value permitting said largest regenerative energy to be provided, based on a transmission ratio command signal output from said transmission ratio determination means.

2. A transmission control system in an electric vehicle according to claim 1, wherein said transmission ratio determination means calculates a regenerative energy corresponding to said transmission ratio by a product among a motor efficiency, a motor torque and a motor revolution number.

3. A transmission control system in an electric vehicle according to claim 1, further including brake control means for discontinuing said regerenative braking and hydraulically braking the driving wheel, when the connection between the driving wheel and the motor is released in order to effect a shifting based on said transmission ratio command signal.

4. A transmission control system in an electric vehicle according to claim 1, wherein said transmission ratio determination means discontinues outputting of said transmission ratio command signal during steering of the vehicle.

5. Apparatus for braking an electric vehicle, comprising means for braking by means of regeneration force;
    means for determining a preferred transmission ratio for operating said means for braking; and
    means for altering a transmission ratio for said vehicle in response to said means for determining.

6. Apparatus as in claim 5, wherein said means for determining comprises means for calculating a first amount of regeneration force to be provided for a present transmission ratio and a second amount of regeneration force to be provided for at least one other transmission ratio; and
    means for comparing said first amount of regeneration force and said second amount of regeneration force.

7. Apparatus as in claim 5, wherein said means for determining comprises means for calculating a first amount of regeneration force to be provided for a first transmission ratio and a second amount of regeneration force to be provided for a second transmission ratio; and
    means for comparing said first amount of regeneration force and said second amount of regeneration force.

8. Apparatus as in claim 5, wherein said means for determining is responsive to a motor speed sensor.

* * * * *